United States Patent
Honermann et al.

(10) Patent No.: US 10,092,868 B2
(45) Date of Patent: *Oct. 9, 2018

(54) LIQUID FILTER ASSEMBLY, SYSTEM AND METHODS

(71) Applicant: Donaldson Company, Inc., Minneapolis, MN (US)

(72) Inventors: Bradley S. Honermann, Prior Lake, MN (US); John R. Hacker, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 375 days.

This patent is subject to a terminal disclaimer.

(21) Appl. No.: 14/853,420

(22) Filed: Sep. 14, 2015

(65) Prior Publication Data
US 2016/0001204 A1    Jan. 7, 2016

Related U.S. Application Data

(63) Continuation of application No. 13/141,263, filed on Aug. 31, 2011, now Pat. No. 9,132,367.

(51) Int. Cl.
B01D 35/30    (2006.01)
B01D 35/147   (2006.01)

(52) U.S. Cl.
CPC ........... B01D 35/30 (2013.01); B01D 35/147 (2013.01); *B01D 2201/291* (2013.01); *B01D 2201/295* (2013.01); *B01D 2201/302* (2013.01); *B01D 2201/4007* (2013.01); *B01D 2201/4053* (2013.01)

(58) Field of Classification Search
CPC .................. B01D 35/147; B01D 29/15; B01D 2201/4046; B01D 29/21; B01D 29/96; Y10T 29/49826
USPC .................... 210/232, 416.4, 416.5, DIG. 17
See application file for complete search history.

(56) References Cited

U.S. PATENT DOCUMENTS

| | | | |
|---|---|---|---|
| 2,748,948 A | 6/1956 | Fricke et al. |
| 4,806,240 A | 2/1989 | Giordano et al. |
| 5,098,559 A | 3/1992 | Mack et al. |
| 5,516,425 A | 5/1996 | Brieden et al. |
| 5,643,446 A | 7/1997 | Clausen et al. |
| 5,681,461 A | 10/1997 | Gullett et al. |
| 5,695,633 A | 12/1997 | Ernst et al. |
| 5,695,636 A | 12/1997 | Gullett |

(Continued)

FOREIGN PATENT DOCUMENTS

| | | |
|---|---|---|
| DE | 42 01 041 A1 | 7/1993 |
| DE | 43 03 695 A1 | 8/1994 |

(Continued)

*Primary Examiner* — Claire A Norris
(74) *Attorney, Agent, or Firm* — Merchant & Gould P.C.

(57) ABSTRACT

A filter cartridge includes a key ring with at least first and second protrusions to engage a lock-out assembly in a filter head, permitting the cartridge to connect to the filter head. A filter system includes a filter assembly, including a filter cartridge and a cartridge housing, connected to a filter head, in which the filter head includes an adapter assembly with a lock-out mechanism. The lock-out mechanism is unlocked by a key ring on the filter cartridge. A method of installing a filter assembly includes using protrusions on a key ring on a filter cartridge to unlock an adapter assembly in a filter head to allow for connection between the filter assembly and the filter head.

8 Claims, 21 Drawing Sheets

(56) References Cited

U.S. PATENT DOCUMENTS

| | | |
|---|---|---|
| 5,753,120 A | 5/1998 | Clausen et al. |
| 5,762,788 A | 6/1998 | Gullett |
| 5,770,065 A | 6/1998 | Popoff et al. |
| 5,814,215 A | 9/1998 | Bruss et al. |
| 5,846,416 A | 12/1998 | Gullett |
| 5,855,780 A | 1/1999 | Dye et al. |
| 5,888,384 A | 3/1999 | Wiederhold et al. |
| 5,902,479 A | 5/1999 | Fukumori et al. |
| 6,015,492 A | 1/2000 | Popoff et al. |
| 6,016,923 A | 1/2000 | Baumann |
| 6,053,334 A | 4/2000 | Popoff et al. |
| 6,113,781 A | 9/2000 | Popoff et al. |
| 6,171,491 B1 | 1/2001 | Popoff et al. |
| 6,177,003 B1 | 1/2001 | Jainek et al. |
| 6,217,763 B1 | 4/2001 | Lawrence et al. |
| 6,235,194 B1 | 5/2001 | Jousset |
| 6,251,273 B1 | 6/2001 | Jawurek et al. |
| 6,485,637 B2 | 11/2002 | Jainek et al. |
| 6,488,845 B1 | 12/2002 | Neufeld et al. |
| 6,495,042 B1 | 12/2002 | Knight |
| 6,506,303 B1 | 1/2003 | Gustafsson et al. |
| 6,543,625 B1 | 4/2003 | Le Roux et al. |
| 6,554,139 B1 | 4/2003 | Maxwell et al. |
| 6,572,768 B1 | 6/2003 | Cline et al. |
| 6,607,665 B2 | 8/2003 | Fick et al. |
| 6,635,175 B2 | 10/2003 | Stankowski |
| 6,679,990 B2 | 1/2004 | Reinhart |
| 6,685,829 B1 | 2/2004 | Baumann et al. |
| 6,709,588 B2 | 3/2004 | Pavlin et al. |
| 6,770,196 B2 | 8/2004 | Wall |
| 6,790,356 B2 | 9/2004 | Wright et al. |
| 6,797,168 B1 | 9/2004 | Knight |
| 6,814,243 B2 | 11/2004 | Amstutz et al. |
| 6,837,993 B2 | 1/2005 | Clausen et al. |
| 6,896,803 B2 | 5/2005 | Cline et al. |
| 6,921,479 B2 | 7/2005 | Ardes |
| 6,926,156 B2 | 8/2005 | Wall |
| 6,926,825 B2 | 8/2005 | Ardes |
| 6,936,161 B2 | 8/2005 | Wright et al. |
| 6,949,182 B2 | 9/2005 | Yano et al. |
| 6,983,851 B2 | 1/2006 | Maxwell et al. |
| 6,986,426 B2 | 1/2006 | Clausen et al. |
| 6,994,796 B2 | 2/2006 | Wall |
| 7,086,537 B2 | 8/2006 | Maxwell et al. |
| 7,163,623 B2 | 1/2007 | Knight |
| 7,204,370 B2 | 4/2007 | Clausen et al. |
| 7,326,342 B2 | 2/2008 | Richmond et al. |
| 7,360,658 B2 | 4/2008 | Clausen et al. |
| 7,390,407 B2 | 6/2008 | Wiendorf et al. |
| 9,132,367 B2 | 9/2015 | Honermann et al. |
| 2002/0020660 A1 | 2/2002 | Jainek et al. |
| 2002/0108897 A1 | 8/2002 | Pavlin et al. |
| 2002/0134726 A1 | 8/2002 | Ardes |
| 2002/0170279 A1 | 11/2002 | Gustafson et al. |
| 2004/0159600 A1 | 8/2004 | Stankowski |
| 2004/0182777 A1 | 9/2004 | Stankowski et al. |
| 2005/0035053 A1 | 2/2005 | Engelhard et al. |
| 2006/0006124 A1 | 1/2006 | Yates et al. |
| 2006/0054547 A1 | 3/2006 | Richmond et al. |
| 2007/0039864 A1 | 2/2007 | Dworatzek et al. |
| 2007/0215561 A1 | 9/2007 | Yates et al. |
| 2007/0267338 A1 | 11/2007 | Menez et al. |
| 2008/0047891 A1 | 2/2008 | Roesgen |
| 2008/0169233 A1 | 7/2008 | Pfitzer et al. |
| 2010/0044295 A1 | 2/2010 | Honermann et al. |
| 2013/0193057 A1 | 8/2013 | Honermann et al. |

FOREIGN PATENT DOCUMENTS

| | | |
|---|---|---|
| DE | 198 52 587 A1 | 2/2000 |
| DE | 199 55 864 A1 | 5/2001 |
| EP | 0 681 094 A1 | 11/1995 |
| EP | 0 839 563 A1 | 5/1998 |
| EP | 1 008 375 A1 | 6/2000 |
| EP | 1 031 367 A1 | 8/2000 |
| EP | 1 110 590 A2 | 6/2001 |
| EP | 1 201 289 A1 | 5/2002 |
| EP | 1 674 142 A1 | 6/2006 |
| EP | 1 623 749 B1 | 9/2007 |
| EP | 1 419 809 B1 | 11/2007 |
| EP | 1 714 688 B1 | 1/2008 |
| EP | 1 866 051 B1 | 6/2008 |
| GB | 615250 | 1/1949 |
| JP | 2003-320206 | 11/2003 |
| WO | WO 02/11854 | 2/2002 |
| WO | WO 02/070869 A1 | 9/2002 |
| WO | WO 03/080215 A1 | 10/2003 |
| WO | WO 2004/069373 A1 | 8/2004 |
| WO | WO 2005/087346 A1 | 9/2005 |
| WO | WO/2006094065 | 9/2006 |
| WO | WO 2008/134494 A2 | 11/2008 |
| WO | WO 2009/132291 A2 | 10/2009 |

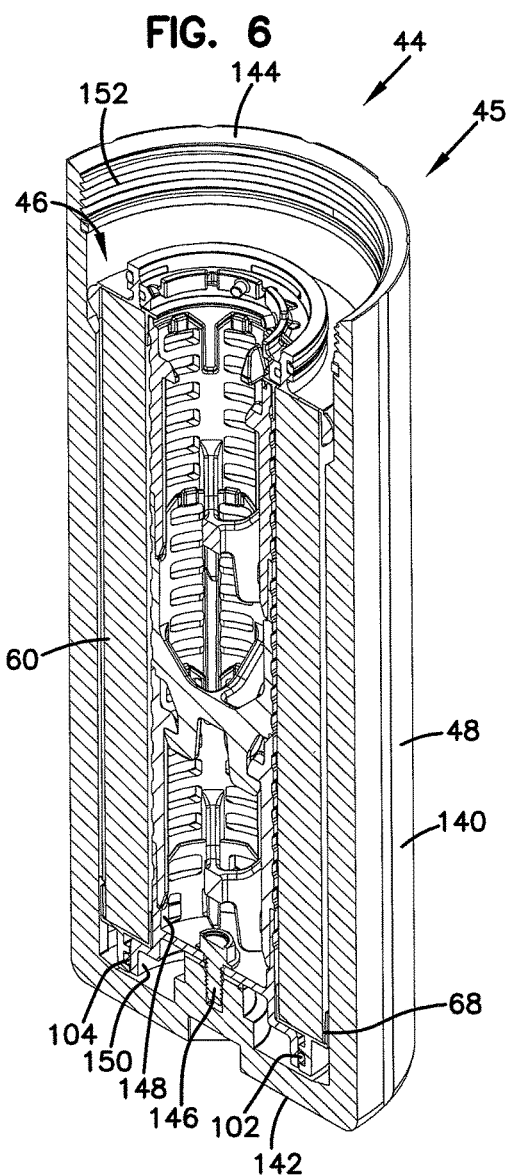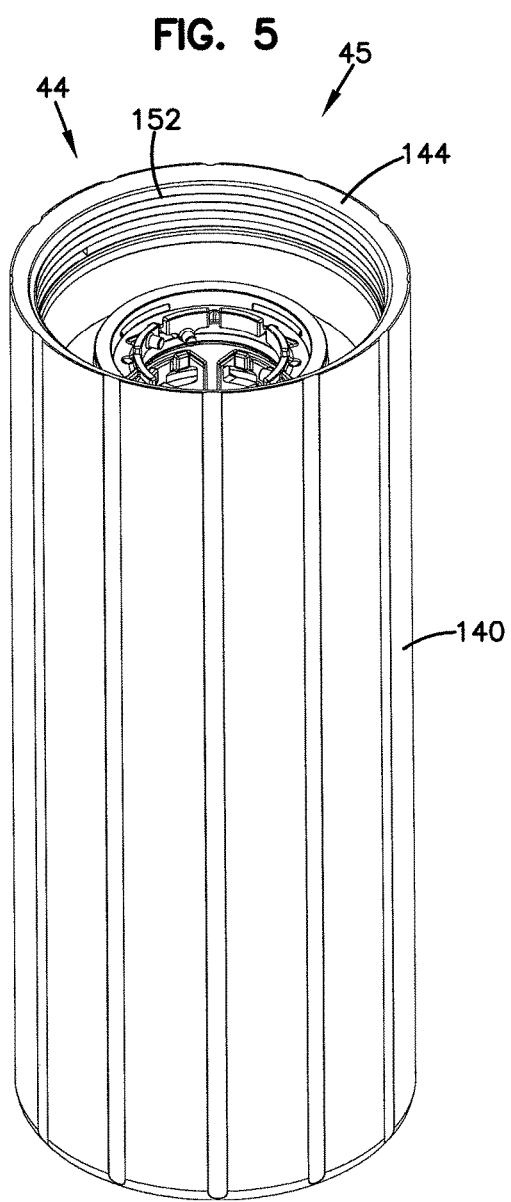

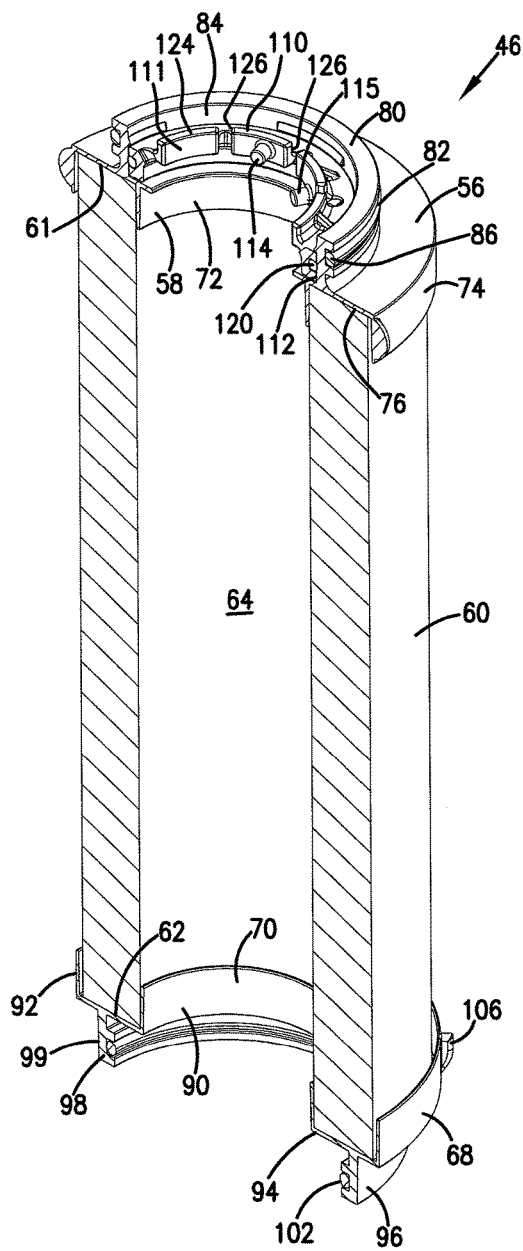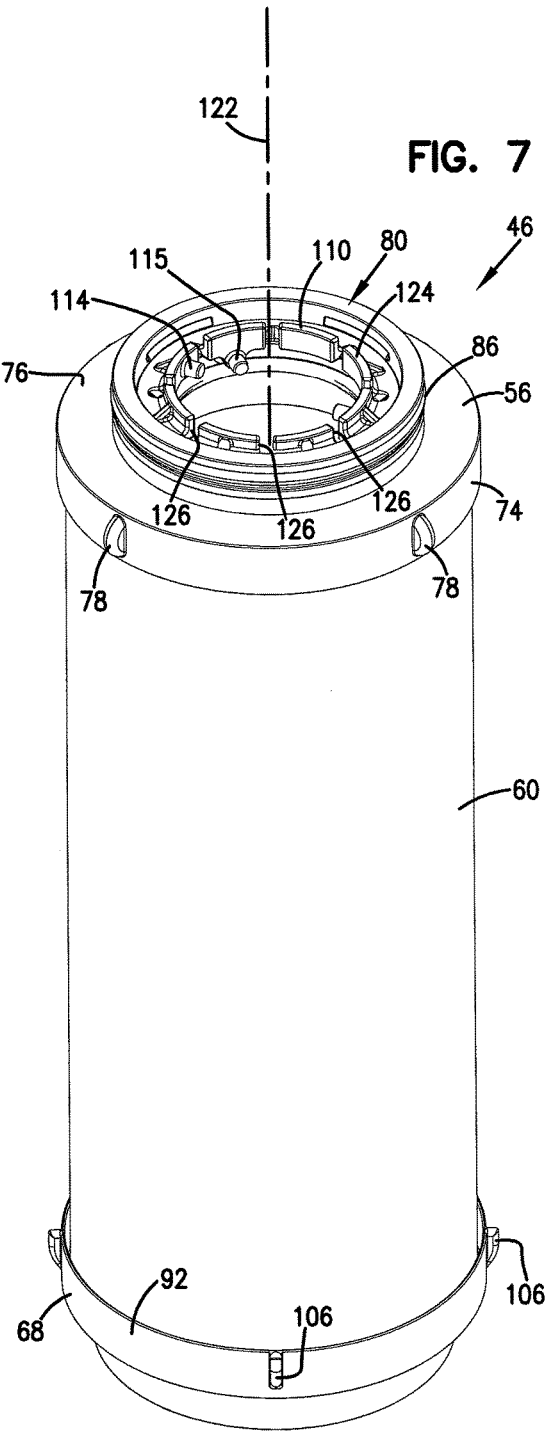

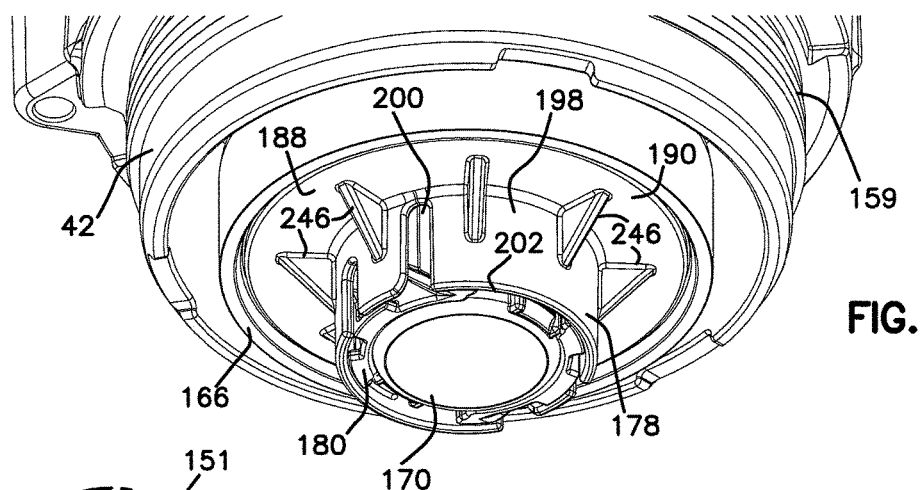
FIG. 14
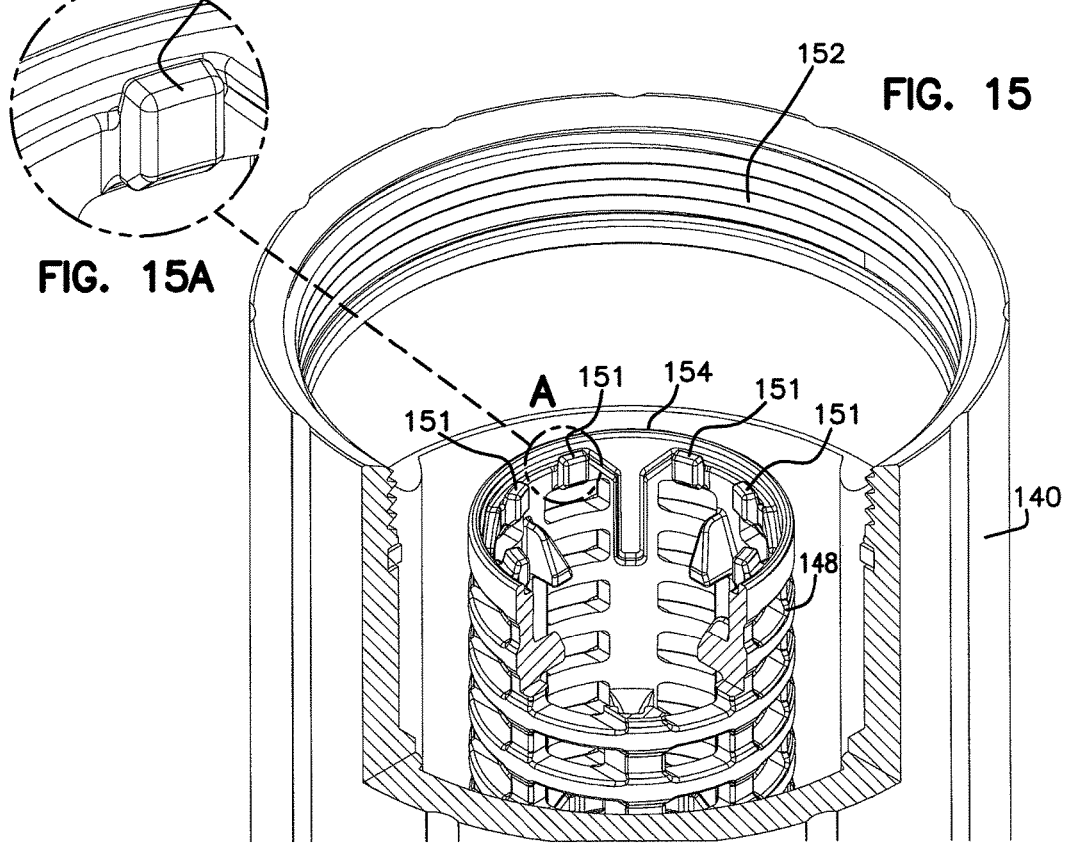
FIG. 15
FIG. 15A

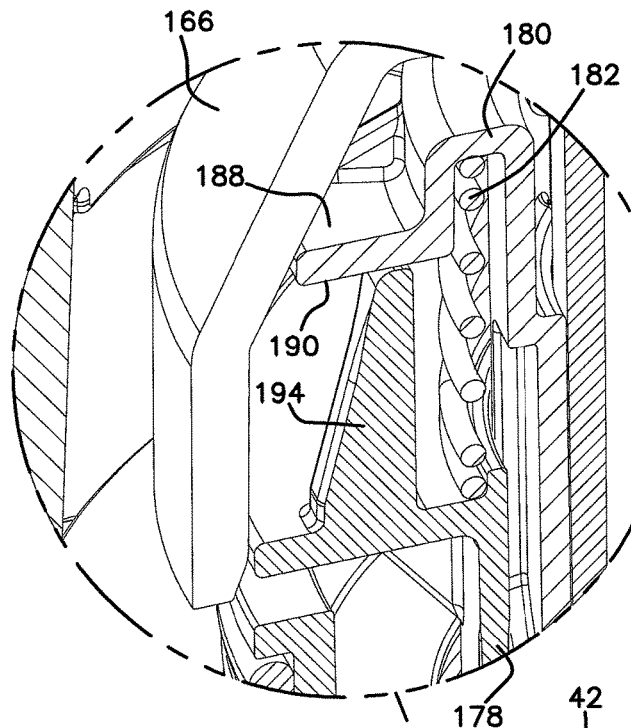
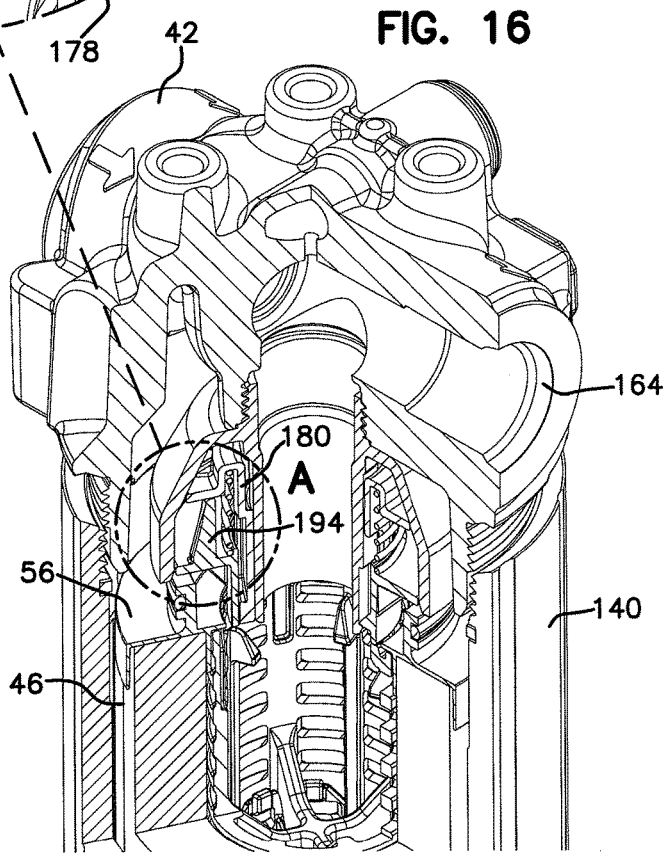
FIG. 16A
FIG. 16

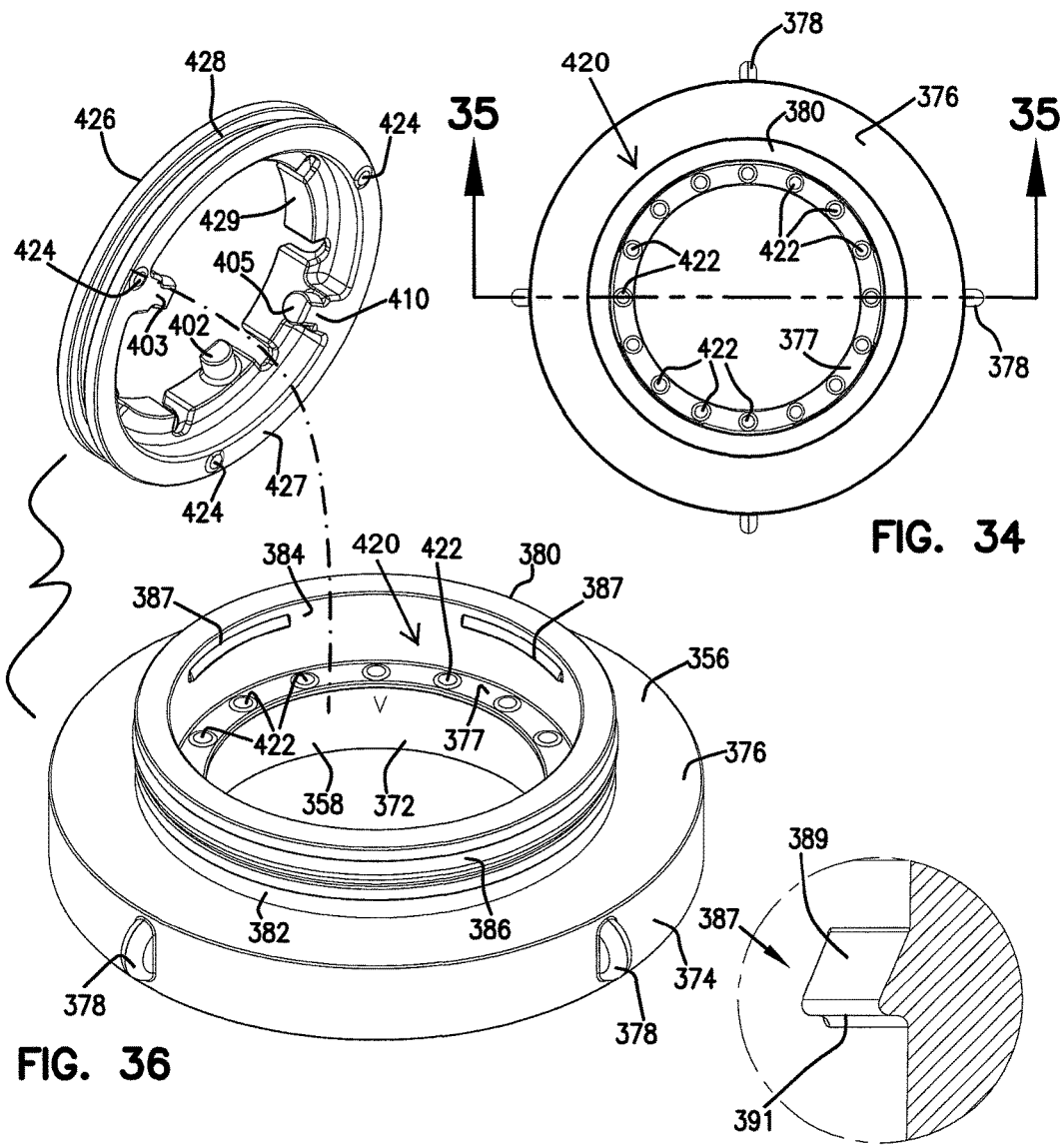
FIG. 34
FIG. 36
FIG. 35A
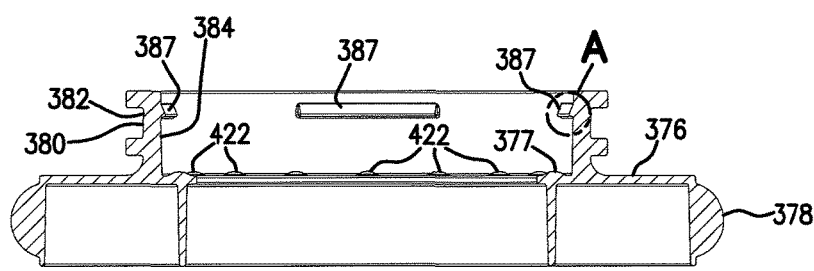
FIG. 35

LIQUID FILTER ASSEMBLY, SYSTEM AND METHODS

This application is a continuation of application Ser. No. 13/141,263 filed Aug. 31, 2011 and issued as U.S. Pat. No. 9,132,367; application Ser. No. 13/141,263 is a national stage application of PCT US 2010/055282 filed on 3 Nov. 2010, PCT US 2010/055282 claims priority to U.S. Provisional patent application Ser. No. 61/258,395, filed Nov. 5, 2009. Each of applications Ser. No. 13/141,263; PCT US 2010/055282; and 61/258,395 is incorporated herein by reference.

TECHNICAL FIELD

This disclosure relates to filtration assemblies and methods. In particular, this disclosure relates to filter assemblies and methods for use in liquid filtration, such as lube filters, hydraulic filters, and fuel filters.

BACKGROUND

Filters are commonly used in connection with lubrication systems and fuel systems for internal combustion engines, and hydraulic systems for heavy-duty equipment. Filters are also used in many other types of liquid systems. In these types of systems, the filter is changed periodically. In the art, there are at least two standard types of filters used. One type is a spin-on canister filter, while the other is a bowl-cartridge filter.

Bowl-cartridge filters typically include a reusable bowl holding a replaceable filter element (filter cartridge). Bowl-cartridge filters are sometimes preferred instead of spin-on canister filters due to disposal or other issues. Bowl-cartridge filters are mounted onto a filter head, and liquid to be cleaned passes through the filter head, into the bowl, through the replaceable filter cartridge, out of the bowl, and back into the filter head. After a period of use, the bowl-cartridge filter is removed from the filter head, and the replaceable filter cartridge is removed from the reusable bowl. The old filter cartridge is discarded and replaced with a new filter cartridge. The new filter cartridge is operably-mounted into the reusable bowl to provide a refurbished bowl-cartridge filter. This refurbished bowl-cartridge filter, containing the new filter cartridge, is then mounted onto the filter head.

Other problems include the possibility of forgetting to replace the filter cartridge after removing the old filter cartridge. That is, after removing the old filter cartridge for servicing, it can be possible to replace the bowl back onto the filter head without operably inserting a new filter cartridge. This can lead to disastrous consequences for the equipment that needs the filtration. Furthermore, when there are multiple filter assemblies within close proximity of each other on one system, sometimes on a common filter head, the person servicing the filters can sometimes get mixed-up regarding which filter assembly goes on where—putting the wrong filter assembly onto the wrong mount on the filter head can lead to catastrophic results. Improvements to address these issues are desirable.

SUMMARY

To address these and other problems, in one aspect, a filter cartridge is provided. A filter cartridge includes a first end cap defining a first open aperture that has an axially extending neck having an outer radial surface and an inner radial surface; a key ring within and against the inner radial surface of the neck and circumscribing the first open aperture; at least first and second protrusions extending from the key ring and into the first open aperture; a tubular construction of filter media defining an open filter interior and having first and second opposite ends, with the first end being secured to the first end cap; and a second end cap secured to the second end of the filter media. The first protrusion is spaced from the second protrusion in a vertical direction along the key ring, and the first protrusion is circumferentially spaced from the second protrusion along the key ring. In use, when the filter cartridge is connected to a filter head, the first and second protrusions engage a lock-out assembly in the filter head permitting the cartridge to connect to the filter head.

In another aspect, a filter assembly is provided including a cartridge housing comprising a bowl that is connectable to the filter head. The filter cartridge is removably mountable in the cartridge housing. Alternatively, the cartridge housing includes a spin-on can that is connectable to the filter head, and the filter cartridge is permanently mounted in the cartridge housing.

In another aspect, a filter system is provided including a filter assembly as characterized above. The filter system includes a filter head, with the filter cartridge operably connectable to the filter head. The filter head includes a filter block with a surrounding wall defining an interior volume and defining an inlet port and an outlet port. An adapter is secured to the filter block within the block interior volume. The adapter has an outer surface circumscribing an inner tubular wall. In some embodiments, the adaptor outer surface is a funnel surface that tapers toward the inner tubular wall in the direction of the filter assembly. In other embodiments, the adaptor outer surface is non-tapered and generally parallel to the inner tubular wall. In either embodiment, the adaptor can be integral to the filer head block or can be a separate component that is permanently or removably connected to the filter head block. The inner tubular wall has an outer radial surface and an inner radial surface. A locking ring is secured to the adapter. The locking ring has a planar base with first and second opposite axial surfaces and defining a central aperture. The inner tubular wall of the adapter fits within the central aperture. A plurality of fingers project from the first axial surface. A locking sleeve is provided. The locking sleeve includes a tubular wall that is against the outer radial surface of the inner tubular wall of the adapter. The locking sleeve tubular wall has a plurality of grooves along the wall. A collar projects from and circumscribes the locking sleeve tubular wall. The collar defines a plurality of finger-receiving apertures. The locking sleeve is rotatable relative to the locking ring from a first locked position to an unlocked position. The first locked position includes the finger-receiving apertures being misaligned from the plurality of fingers in the locking ring. The unlocked position includes the finger-receiving apertures being in alignment with the plurality of fingers in the locking ring. The fingers penetrate the finger-receiving apertures to allow the locking ring to move axially relative to the locking sleeve and the adapter. A locking spring is provided to bias the locking sleeve in the first locked position.

In another aspect, a method of installing a filter assembly including a filter cartridge and cartridge housing onto a filter head is provided. The method includes orienting a filter assembly, including a filter cartridge and housing, onto a filter head. The filter head includes a block holding a locking ring and a locking sleeve. The locking ring has a plurality of fingers. The locking sleeve includes a tubular wall, a collar projecting from and circumscribing the locking sleeve tubular wall and defining a plurality of finger-receiving apertures; the locking sleeve being rotatable relative to the locking ring from a first locked position to an unlocked position; the first locked position including the finger-receiving apertures being misaligned from the plurality of fingers in the locking ring, and the unlocked position including the finger-receiving apertures being in alignment with the plurality of fingers in the locking ring. The method includes while orienting, pushing the filter assembly against the locking sleeve to rotate the sleeve and move the sleeve from the locked position to the unlocked position, which aligns the fingers of the locking ring with the finger-receiving apertures of the locking sleeve. Next, the method includes axially moving both the filter assembly and the locking ring relative to the block. Next, there is a step of operably connecting the filter assembly to the filter head.

It is noted that not all the specific features described herein need to be incorporated in an arrangement for the arrangement to have some selected advantage according to the present disclosure.

BRIEF DESCRIPTION OF THE DRAWINGS

FIG. 5 is a perspective view of the filter assembly used with the filter head of FIG. 1, the filter assembly including the filter cartridge and cartridge housing;

FIG. 6 is a cross-sectional perspective view of the filter assembly of FIG. 5;

FIG. 7 is a perspective view of the filter cartridge used in FIGS. 1, 2, 5, and 6;

FIG. 8 is a cross-sectional perspective view of the filter cartridge of FIG. 7;

FIG. 14 is a bottom, perspective view of a portion of the filter head of FIG. 3, in which the adapter assembly can be seen;

FIG. 15 is a perspective view of a portion of the filter cartridge housing of FIGS. 5 and 6, with a portion cut away to show parts of an inner liner that engage with portions of the adapter assembly if an attempt is made to connect the cartridge housing with the filter head and without a proper filter cartridge installed therein;

FIG. 15A is an enlarged portion of the filter cartridge housing shown in FIG. 15;

FIG. 16 is a cross-sectional, perspective view of a portion of a filter assembly, with a filter cartridge without a key ring that is unable to unlock the adapter assembly to allow for connection of the filter assembly to the filter head;

FIG. 16A is an enlarged view of a portion of FIG. 16;

FIG. 34 is a top view of another embodiment of an end cap usable with the system previously described;

FIG. 35 is a cross-sectional view of the end cap of FIG. 34, the cross-section being taken along the line 35-35 of FIG. 34;

FIG. 35A is an enlarged view of a portion of the cross-section of FIG. 35 shown at section A in FIG. 35;

FIG. 36 is an exploded, perspective view of the end cap of FIGS. 34 and 35 along with a second embodiment of a key ring usable with the end cap of FIGS. 34 and 35;

DETAILED DESCRIPTION

A. Overview

Figures 1, 2:
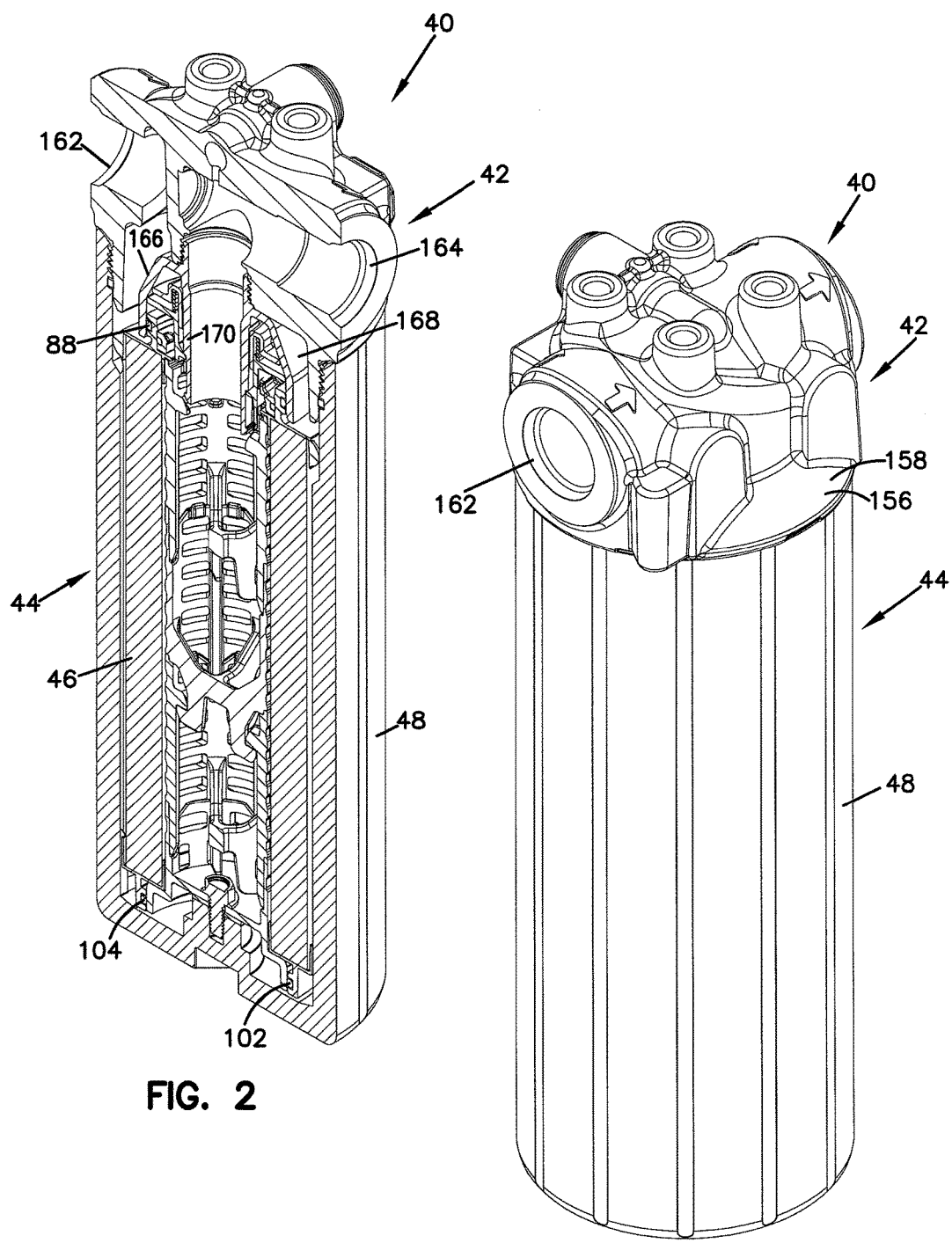
FIG. 1 is a perspective view of a filter system including a filter head, cartridge housing, and filter cartridge, constructed in accordance with principles of this disclosure.
FIG. 2 is a cross-sectional view of the filter system of FIG. 1.

An example embodiment of a filtration system including a filter assembly and a filter head is depicted in the accompanying figures. It should be realized that many examples are envisioned and not illustrated in the drawings. FIG. 1 shows a filter system 40 including a filter head 42 and a filter assembly 44.

In FIG. 1, a fully assembled filter system 40 is illustrated, while in FIG. 2, a cross-sectional view of the filter system 40 is illustrated. The filter assembly 44 is selectively connectable and mountable on the filter head 42. The filter head 42 is connected with other equipment, including, for example, a lubrication system of an engine, a fuel system for an engine, a hydraulic system for heavy-duty equipment, and appropriate systems for generators for industrial use.

The filter assembly 44 includes a filter cartridge 46 and a cartridge housing 48. The cartridge 46 can be a removable and replaceable cartridge 46 with respect to the cartridge housing 48; alternatively, the filter cartridge can be part of a spin-on filter assembly 50 (FIGS. 9 and 10), in which the filter cartridge 52 is permanently mounted within a can 54.

In the embodiment illustrated, the filter system 40 includes a lock-out feature. In general, the lock-out feature ensures that the filter system 40 is not accidentally operated with equipment without an appropriate filter cartridge 46 or 52 installed therein.

The following are example embodiments only. A variety of implementations can be made without departing from the scope of the disclosure. Not all of the references numerals are shown on each FIG., for purposes of clarity.

B. Example Filter Cartridges FIGS. 7-10

In reference now to FIGS. 7 and 8, a first embodiment of the filter cartridge 46 is illustrated. The filter cartridge 46 is provided for releasable connection with the filter head 42. In this embodiment, the filter cartridge 46 is a filter cartridge that is removable and replaceable from cartridge housing 48, as part of a bowl-cartridge filter assembly 45 (FIGS. 5 and 6).

In the embodiment of FIGS. 7 and 8, the filter cartridge 46 includes a first end cap 56. In the one shown here, the first end cap 56 has a first open aperture 58. A tubular construction of filter media 60 having first and second ends 61, 62 defines an open filter interior 64. The first aperture 58 defined by the first end cap 56 is in communication with the open filter interior 64. The first end 61 of the filter media 60 is secured to the first end cap 56, in the example illustrated. The filter media 60 can be selected to be any type of media that is appropriate for the intended filtration system. Many typical embodiments will include pleated media made from cellulose material, synthetic material, or blends thereof.

In this embodiment, there is also a second end cap 68 secured to the second end 62 of the filter media 60. This example embodiment further shows that the second end cap 68 defines a second open aperture 70, which is in communication with the open filter interior 64. In the spin-on filter assembly 50, discussed in connection with FIGS. 9 and 10, the second end cap 68 is a closed end cap and does not define an open aperture in communication with the open filter interior 64.

In this embodiment, the first end cap 56 has an inner wall 72 lining the first open aperture 58, an outer wall 74 circumscribing the filter media 60, and a transverse base 76 extending between the inner wall 72 and outer wall 74. The base 76 also covers the first end 61 of the filter media 60. This embodiment of the first end cap 56 further includes a plurality of radial projections 78 (FIG. 7) that extend radially from the outer wall 74 of the end cap 56. The projections 78 help to center the cartridge 46 within the cartridge housing 48.

In this embodiment, the first end cap 56 defines an axially extending neck 80. In the embodiment shown, the neck 80 extends or projects axially from the base 76 and defines an outer radial surface 82 and an opposite inner radial surface 84.

In general, the first end cap 56 can be used to hold a first end cap seal member 86. The first end cap seal member 86 is used for forming a seal 88 (FIG. 2) between the filter cartridge 46 and the filter head 42.

In the embodiment shown, the first end cap seal member 86 is held by the neck 80. In the specific implementation illustrated, the first end cap seal member 86 is held against the outer radial surface 82 of the neck 80.

In the embodiment of FIGS. 7 and 8, the second end cap 68 is constructed similarly to the first end cap 56, in that it has an inner wall 90 that lines the second open aperture 70, an outer wall 92 that circumscribes the filter media 60, and a transverse base 94 extending between the inner wall 90 and outer wall 92. The transverse base 94, in this embodiment, covers the second end 62 of the media 60. In the illustrated embodiment, the second end cap 68 further includes an axially extending neck 96 extending or projecting from the base 94 in a direction away from the filter media 60. The neck 96 includes an inner radial surface 98 and an opposite outer radial surface 99. In the embodiment shown, the neck 96 is spaced from each of the inner wall 90 and outer wall 92.

In general, in this embodiment, the second end cap 68 further holds a second end cap seal member 102. The second end cap seal member 102 is for forming a seal 104 (FIG. 2) with the cartridge housing 48. In the embodiment shown, the second end cap seal member 102 is held against the inner radial surface 98 of the neck 96.

Figures 9, 10:
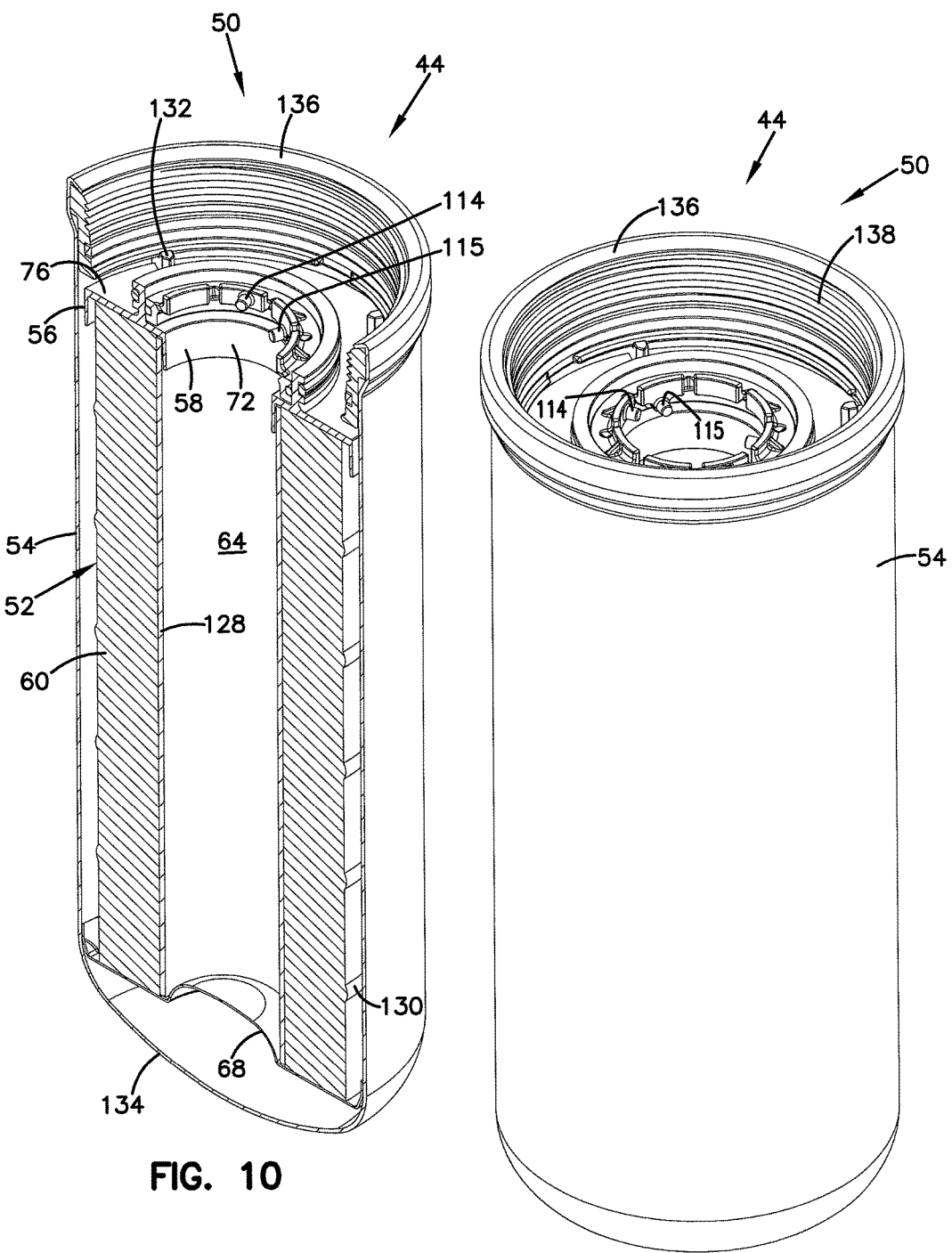
FIG. 9 is a perspective view of an alternate embodiment of a filter assembly including a filter cartridge and cartridge housing which is usable with the filter head of FIG. 3.
FIG. 10 is a cross-sectional perspective view of the filter assembly of FIG. 9.

In the spin-on assembly 50 of FIGS. 9 and 10, because the second end cap 68 is a closed end cap, there is no need for a seal member at the second end cap 68.

Thus, in the spin-on embodiment of FIGS. 9 and 10, the second end cap 68 does not hold any type of seal member.

Turning again to the embodiment of FIGS. 7 and 8, the second end cap 68 includes projections 106 extending or projecting radially from the outer wall 92 of the second end cap 68. The projections 106 are circumferentially spaced relative to each other and have a function similar to the projections 78, in that they help to center the cartridge 46 and space it from an inner wall of the cartridge housing 48.

In accordance with principles of this disclosure, the filter cartridge 46 further includes a key ring 110. The key ring 110 is for providing protrusions, as explained below, which will engage a lock-out assembly in the filter head 42 to permit the filter cartridge 46 to connect to the filter head 42. In the embodiment shown, the key ring 110 is positioned within and against the inner radial surface 84 of the neck 80. In this embodiment, the key ring 110 circumscribes the first open aperture 58.

In general, the filter cartridge 46 includes at least first and second protrusions 114, 115 extending from the key ring 110 and into the first open aperture 58. The first protrusion 114 is spaced from the second protrusion 115 in a vertical direction along the key ring 110. The first protrusion 114 is also spaced from the second protrusion 115 circumferentially along the key ring 110. When the filter cartridge 46 is connected to the filter head 42, the first and second protrusions 114, 115 engage a lock-out assembly in the filter head 42 which permits the filter cartridge 46 to connect to the filter head 42.

In the embodiment illustrated, the first protrusion 114 and the second protrusion 115 are located circumferentially spaced within 50 degrees of each other. In many embodiments, the first protrusion 114 and second protrusion 115 are located greater than 35 degrees, for example 40-43 degrees of each other along the inner circumference of the key ring 110.

In preferred embodiments, the first open aperture 58 is circular and defines an inner diameter. Preferably, the vertical distance between the first and second protrusions 114, 115 is 2-30% of the inner diameter of the first open aperture 58, for example, about 8-15% and more specifically, about 11-12%, of the inner diameter of the first open aperture. In many embodiments, the first protrusion 114 extends into the first open aperture 58 no greater than 40% of the inner diameter of the first open aperture 58, for example, no greater than 10%, typically between 0.5 and 3% of the inner diameter of the first open aperture 58. Similarly, the second protrusion 115 extends into the first open aperture 58 no greater than 40% of the inner diameter of the first open aperture 58, for example, no greater than 10%, typically between 0.5 and 3% of the inner diameter of the first open aperture 58. In the example embodiment illustrated, the first and second protrusions 114, 115 extend a same amount into the first open aperture 58. In other embodiments, one of the first and second protrusions 114, 115 can be longer than the other.

Figure 21:
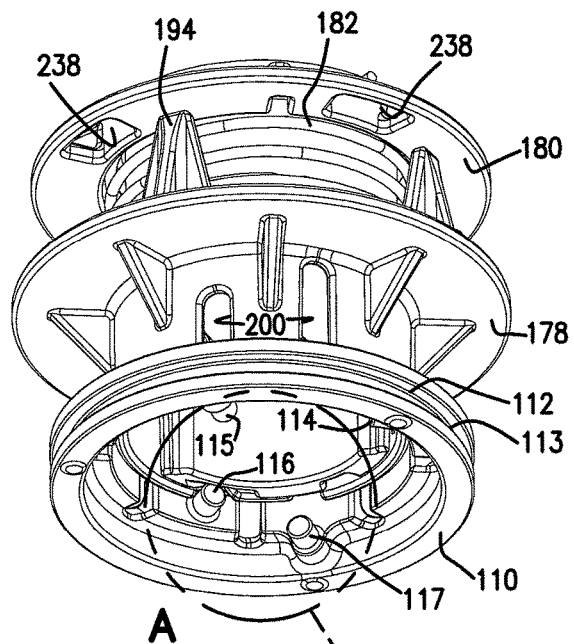
FIG. 21 is a perspective view of the assembly of FIG. 19 in a first locked position showing portions of the key ring aligned with grooves on the locking sleeve.
Figure 21A:
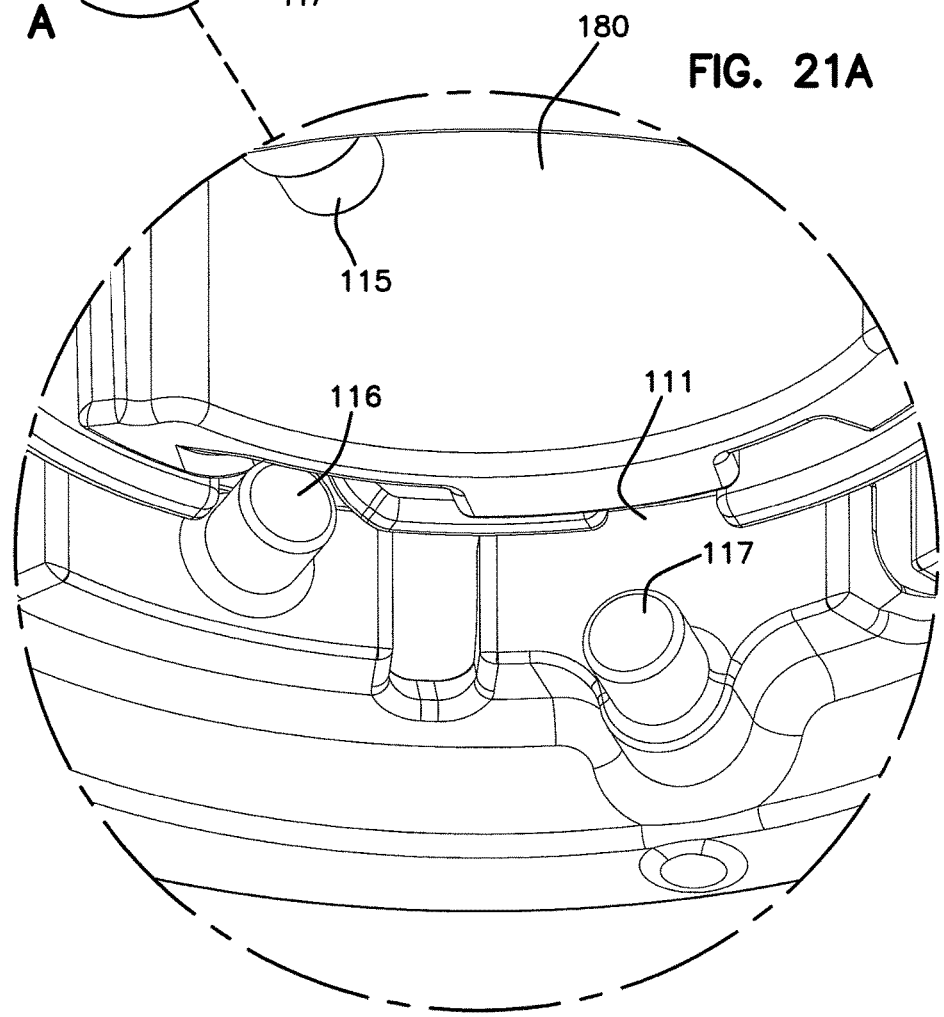
FIG. 21A is an enlarged perspective view of a portion of FIG. 21.

Attention is directed to FIG. 21, which is a perspective view of the key ring 110 that is illustrated as being removed from other portions of the filter cartridge 46, for purposes of clarity. The key ring 110 in FIG. 21 is shown interfacing with portions of a lock-out mechanism in connection with the filter head 42, to be discussed further below. In FIG. 21, it can be seen how the key ring 110 further includes at least a third protrusion 116 extending from the key ring 110 and into the first open aperture 58. The third protrusion 116 is circumferentially spaced from the first protrusion 114 and the second protrusion 115. The third protrusion 116 is vertically spaced from only one of either the first protrusion 114 or the second protrusion 115; in other words, the third protrusion 116 is evenly spaced at the same vertical distance along the key ring 110 with only one of either the first protrusion 114 or the second protrusion 115.

In FIG. 21, it can be seen that, in the embodiment illustrated, there is further included at least a fourth protrusion 117. The fourth protrusion 117 extends radially inwardly from an inner wall 111 of the key ring 110, in the same manner than the first protrusion 114, second protrusion 115, and third protrusion 116 each extend radially inwardly from the inner wall 111. The fourth protrusion 117 also extends into the first open aperture 58. The fourth protrusion 117 is circumferentially spaced from the first protrusion 114, the second protrusion 115, and the third protrusion 116. The fourth protrusion 117 is vertically spaced from only two of the first protrusion 114, the second protrusion 115, or the third protrusion 116. In other words, the fourth protrusion 117 is vertically even with only one of the other protrusions 114, 115, and 116.

In the particular embodiment illustrated, the third protrusion 116 is vertically spaced from the second protrusion 115 and the fourth protrusion 117, while it is vertically even with the first protrusion 114. Also, in the illustrated embodiment, the fourth protrusion 117 is vertically even with the second protrusion 115, while being vertically spaced from the first protrusion 114 and the third protrusion 116.

While the embodiment of FIG. 21 identifies the first protrusion at 114, it could also be located at the physical location of the third protrusion 116. Likewise, while the second protrusion is shown at the location of reference numeral 115, it could also be at the location of the fourth protrusion 117. In other words, in one contemplated embodiment, the arrangement of protrusions can include only a protrusion located at 114 and a protrusion located at 115. Another variation includes an arrangement of protrusions as including a protrusion only at 114 and only at 117. Another variation of the arrangement of protrusions includes a protrusion only at 116 and 117. Another variation would include a protrusion only at 115 and only at 116. In the particular embodiment illustrated, the protrusion arrangement includes the illustrated four protrusions at 114, 115, 116, and 117. Additional protrusions can be utilized to help cooperate with other features of the system 40, but in the embodiment of FIG. 21, there are only four protrusions shown.

In the embodiment shown, two of the four protrusions are circumferentially spaced within 45 degrees of each other, for example, about 40-43 degrees of each other, while a remaining two of the four protrusions are located within 45 degrees of each other, for example, about 40-43 degrees of each other. In the embodiment illustrated in FIG. 21, the first protrusion 114 and second protrusion 115 are circumferentially spaced within 45 degrees of each other, while the third protrusion 116 and fourth protrusion 117 are circumferentially spaced within 45 degrees of each other. In general, in preferred embodiments, the first protrusion 114 and second protrusion 115 are circumferentially spaced within 50 degrees of each other.

In some arrangements, one of the protrusions will be located greater than 45 degrees relative to the other protrusion. For example, consider an embodiment in which the protrusion arrangement includes a first protrusion at 114 and a second protrusion is located at location 117; in such an embodiment, the protrusions are located greater than 45 degrees relative to each other. In such a case, it could be said that the first protrusion 114 and the protrusion located at reference numeral 117 are circumferentially spaced greater than 45 degrees of each other. An analogous embodiment would include a protrusion located only at locations 115 and 116.

In example systems, the key ring 110 is separate from the first end cap 56 because the key ring 110 needs to be able to rotate about its center line (central longitudinal axis) with the first end cap 56 during a first phase of installation, and then the first end cap 56 needs to be able to continue to rotate while the key ring 110 cannot during a second phase of installation. In the first phase, the cartridge 52 is installed in the cartridge housing 48 and is rotationally fixed to the cartridge housing 48 by way of the seal 104 (in this example, a radial seal) between the second end cap 68 and the wall 150 (FIG. 6) that is part of the cartridge housing 48. At this point, the key ring 110 should rotate with the filter cartridge 52 and the cartridge housing 48 for the technician who is installing the cartridge 48 onto the filter head 42 to properly line up the protrusions 114-117 on the key ring 110 with appropriate slots in a locking ring 178 (described further below). Once the protrusions 114-117 are properly aligned with slots in the locking ring 178, any further upward axial motion will cause the key ring 110 to no longer be able to rotate about its center line. The key ring 110 can no longer rotate about its center line, but may only move axial upwardly in a direction toward the filter head 42, which the first end cap 56 continues to both rotate and move axially upwardly.

The way in which to implement the selective rotation function of the key ring 110 relative to the end cap 56 can be done in a number of different ways. One way is shown in FIGS. 34-36, described further below. In this embodiment, a friction-inducing structure is used, for example, embodied as a ring 120.

The friction ring 120 is between an outer radial surface 112 (FIG. 21, within groove 113 of FIG. 21) of the key ring 110 and the inner radial surface 84 of the neck 80. The friction ring 120 holds the key ring 110 fixed to the first end cap 56, but under rotational force, permits the key ring 110 to move rotationally about a central longitudinal axis 122 relative to the first end cap 56. The friction ring 120 helps when assembling the filter assembly 44 with the filter head 42. The friction ring 120 can be used to create enough drag between the surface of the end cap 56 and the key ring 110 to allow the key ring 110 to rotate with the end cap 56, but not so much drag that once the protrusions 114-117 start to move upwardly in slots of the lock ring 178, the key ring 110 only moves axially upwardly while the end cap 56 both rotates and moves axially upwardly.

The key ring 110, in this embodiment, further includes an axial end tip 124 defining a plurality of circumferentially spaced open slots 126. The slots 126 are provided to receive parts of the filter head 42, when the filter cartridge 46 is mounted onto the filter head 42. This is discussed further below.

In reference now to FIGS. 9 and 10, the spin-on assembly 50 is further discussed. As mentioned above, the cartridge 52 is permanently connected to the cartridge housing, which in this embodiment, is a can 54. The same reference numerals for the filter cartridge 46 in FIGS. 7 and 8 are used for the analogous features for the cartridge 52 of FIGS. 9 and 10. One of the main differences between the cartridge of FIGS. 7 and 8 verses the cartridge of FIGS. 9 and 10 is the second end cap 68, which is closed in the spin-on embodiment of FIGS. 9 and 10. In the embodiment of FIGS. 9 and 10, an inner liner 128 is against the inner portion of the filter media 60 to help support the filter media 60. In this embodiment, an outer filter support 130 can be seen supporting the outer radial portion of the filter media 60. The outer filter support 130 is illustrated in this embodiment as a series of polymer beads.

In the embodiment of FIGS. 9 and 10, the first end cap 56 includes a plurality of axial projections 132 extending or projecting axially from the base 76 of the first end cap 56. The axial projections 132 engage a portion of the can 54 to help ensure that the filter cartridge 52 is spaced from an inner wall of the can 54 to allow for the flow of fluid in between the can 54 and the media 60.

The can 54 includes a closed end 134 at one end, and an open mouth 136 at an opposite end. The open mouth 136 is constructed and arranged to operably connect to the filter head 42. In the embodiment shown, the inner wall of the can 54 adjacent to the open mouth 136 includes threads 138 that are constructed and arranged to mate with threads on the filter head 42.

Turning now to the bowl filter assembly 45 illustrated in FIGS. 5 and 6, the cartridge housing 48, in this embodiment, is a bowl 140. The filter cartridge 46 is removable and replaceable from the bowl 140. The bowl 140 includes a closed end 142 and an opposite open mouth 144. The closed end 142 can include a valve or drain arrangement or other type of plug that can be used to drain the bowl 140. In the embodiment illustrated, rather than a valve or drain-type structure at the closed end 142 of the bowl, there is shown a fastener 146 used to secure an inner liner 148 to the bowl 140. The inner liner 148 is attached to the bowl 140 and the filter cartridge 46 will be releasably secured over and around the inner liner 148. As can be seen in the embodiment of FIG. 6, the inner liner 148 preferably extends the length of the filter media 60. The inner liner 148 is porous to allow the flow of liquid there through. The inner liner 148 helps to radially support and hold the filter media 60 during filtration.

In FIGS. 15 and 15A, it can be seen how, in the embodiment depicted, the inner liner 148 includes a plurality of tabs 151 projecting radially inwardly from the inner liner 148 adjacent to an end rim 154. As will be explained further below, if an attempt is made to install the bowl 140 without the filter cartridge 46 or with a filter cartridge but a filter cartridge that does not have a key ring 110, the bowl 140 cannot move up close enough to engage the threads 152 on the bowl 140 with the threads 159 on the surrounding wall 158 of the filter head 42.

As can also be seen in FIG. 6, the inner liner 148 has a solid, nonporous circumferential wall 150 that is shown to be underneath the second end cap 68. The wall 158 provides a sealing surface for the second seal member 102 to form the seal 104 there against.

The bowl 140 includes threads 152 adjacent to the mouth 144. The threads 152 are for releasable connection with the filter head 42.

Figure 3:
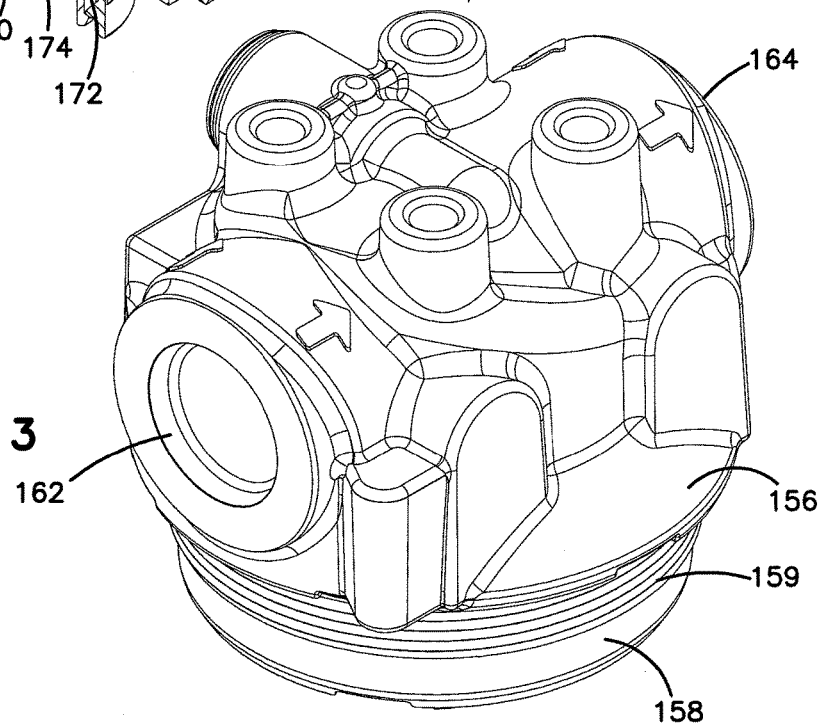
FIG. 3 is a perspective view of the filter head of FIG. 1.

C. Example Filter Head, FIGS. 3 and 4

Figure 4:
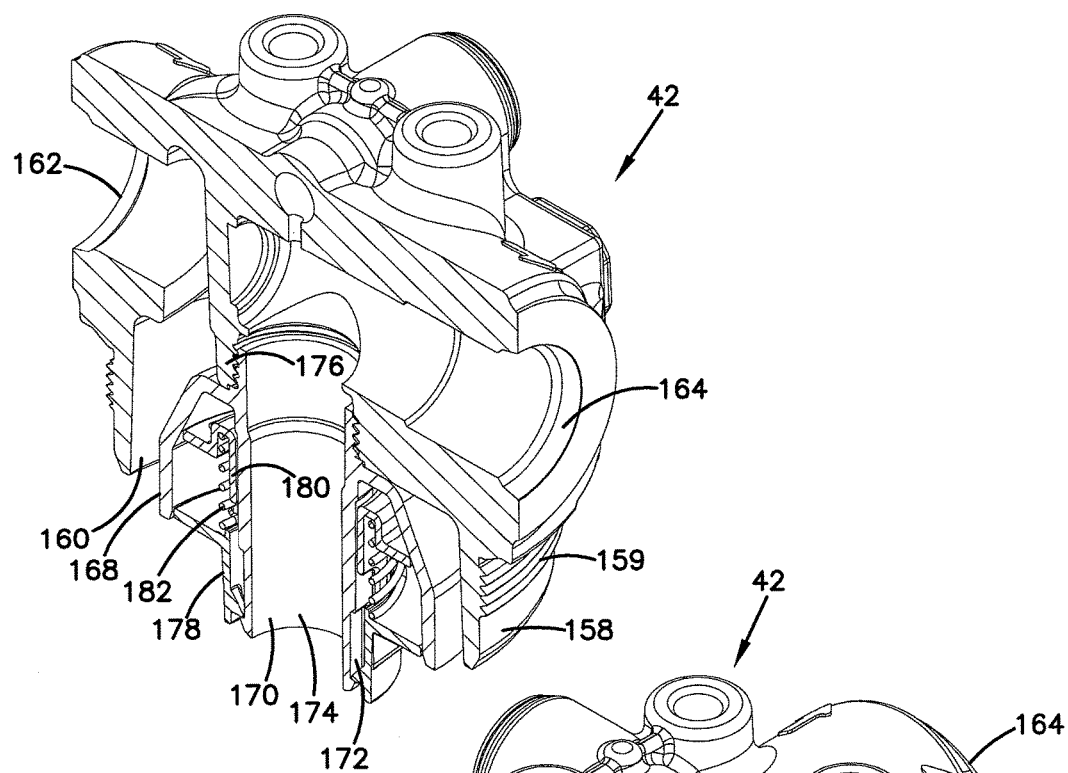
FIG. 4 is a cross-sectional view of the head of FIG. 3.

An overview of the filter head 42 is now provided. In reference to FIGS. 1-4, and in particular to FIGS. 3 and 4, an example embodiment of the filter head 42 is illustrated. The filter head includes a filter block 156 with a surrounding wall 158 defining an interior volume 160 (FIG. 4). The filter block 156 defines an inlet port 162 for taking in the unfiltered liquid, and an outlet port 164 for outputting the filter liquid. In the example embodiment illustrated, the inlet port 162 and the outlet port 164 are set up for a forward flow filter system, in which fluid flows into the filter head 42 through the inlet port 162, around the outside of the filter media 60, through the filter media 60, into the filter interior 64, and then out through the outlet port 164 of the filter head 42. That is, the flow is "standard flow." In other arrangements, the filter system 40 could be set up for reverse-flow, in which the liquid would flow from the filter head 42 into the filter interior 64, then through the filter media 60, and then through an outlet port in the filter head 42.

Secured to the filter block 156 is an adapter 166. The adapter 166 is secured to the filter block 156 within the block interior volume 160. The adapter 166 includes an outer surface 168 (in this example, the outer surface 168 is a funnel surface 168) circumscribing an inner tubular wall 170. By use of the term funnel surface, it is meant that outer surface 168 tapers toward inner tubular wall 170 in the direction of filter assembly 44. The inner tubular wall 170 has an outer radial surface 172 and an inner radial surface 174. The inner tubular wall 170 is secured to the filter block 156, in the embodiment shown, at a secured threaded connection 176. In the embodiment shown, the inner tubular wall 170 forms an outlet channel, in open filter communication with the open filter interior 64, such that filtered liquid flows from the open filter interior 64 through the inner tubular wall 170 and then through the outlet port 164.

Within the filter head 42 is also included a locking ring 178 secured to the adapter 166; a locking sleeve 180; and a locking spring 182. Each of these components is discussed further below in connection with the filter lock out mechanism.

Figure 32:
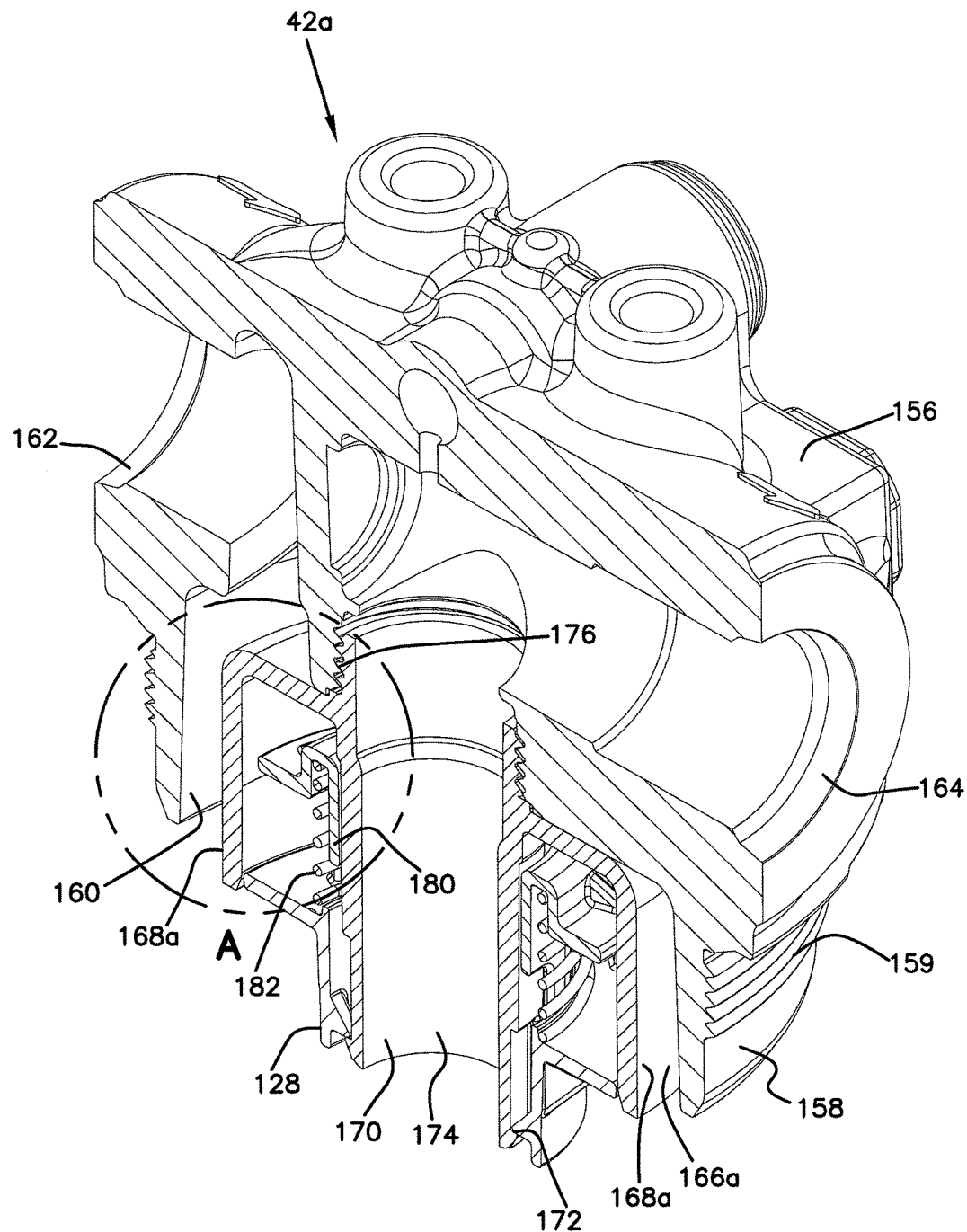
FIG. 32 is a perspective, cross-sectional view of another embodiment of a portion of a filter head.

In a second embodiment, a filter head 42a is shown at FIG. 32. The filter head 42a includes many of the same features described and shown for filter head 42. As such, similar reference numbers have been used where the features are essentially the same. The entire description for filter head 42 is hereby incorporated for the embodiment shown in FIG. 32. As shown, filter head 42a differs from filter head 42 in the respect that filter head 42a has an adapter 166a having an outer surface 168a that is non-tapered. Instead, outer surface 168a is generally parallel to inner tubular wall 170. It is therefore possible for the outer surface of the adapter 166 to take a number of shapes and configurations without departing from the concepts presented herein.

Figure 33:
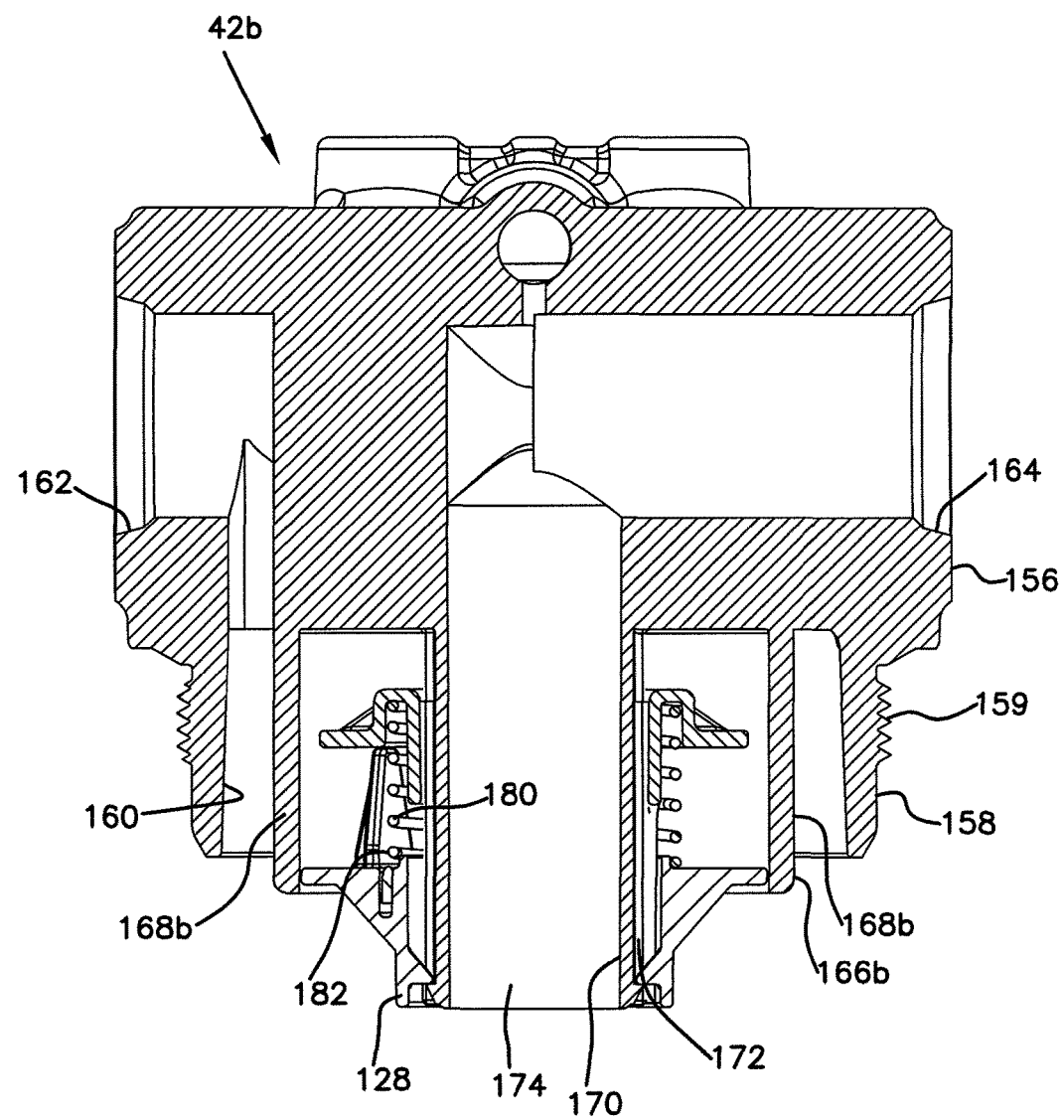
FIG. 33 is a cross-sectional view of another embodiment of a portion of a filter head.

In a third embodiment, a filter head 42b is shown at FIG. 33. Filter head 42b includes many of the same features described and shown for filter head 42. As such, similar reference numbers have been used where the features are essentially the same. The entire description for filter head 42 is hereby incorporated for the embodiment shown in FIG. 33. As shown, filter head 42b differs from filter head 42 in two respects. First, adapter 166b includes an outer surface 168b that is generally parallel to inner tubular wall 170 rather than being a funnel surface. Second, adapter 166b is formed as an integral part of filter block 156 instead of being secured by a threaded connection 176. It is equally possible that adapters 166 and 166a could be formed integrally with the filter block 156 as well.

D. Adapter Assembly 186

Figure 11:
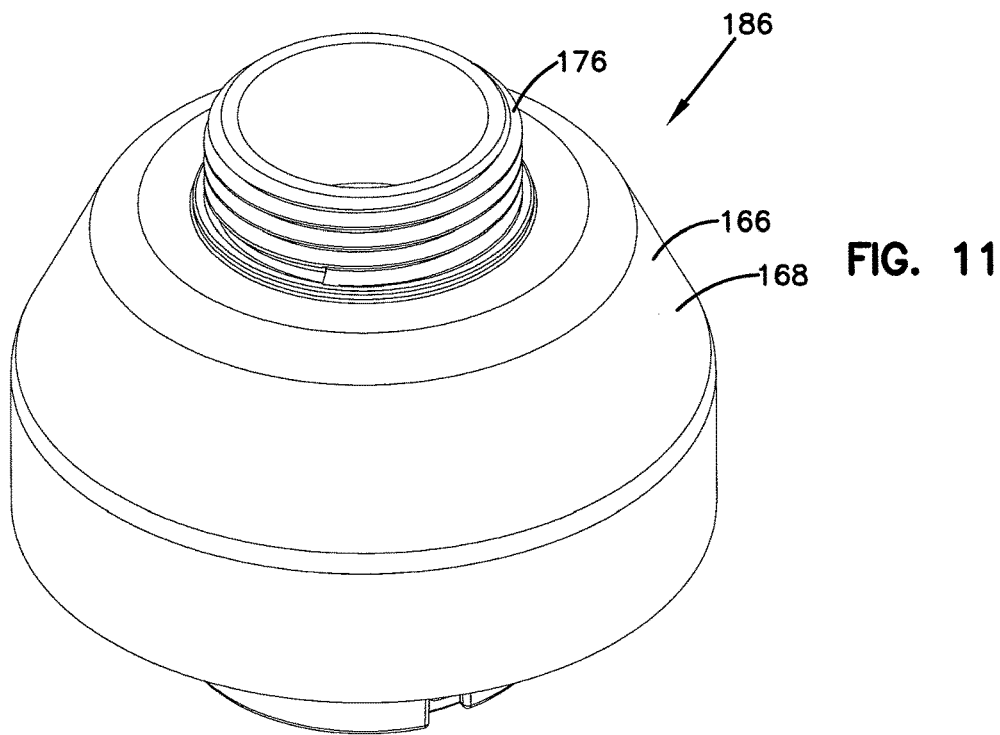
FIG. 11 is a perspective view of an adapter assembly that is utilized in the filter head of FIGS. 1-4.
Figure 12:
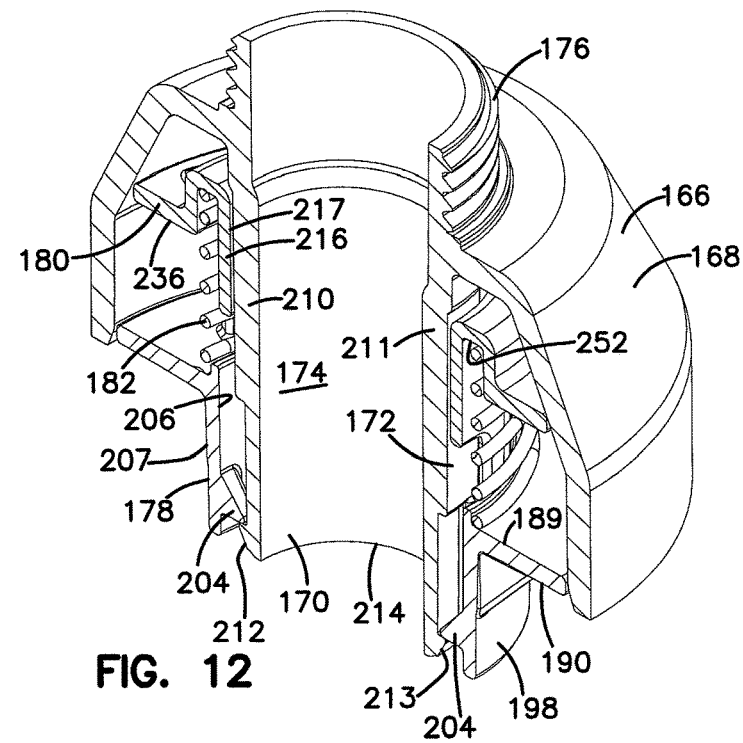
FIG. 12 is a cross-sectional perspective view of the adapter assembly of FIG. 11, including a locking sleeve, locking spring, and locking ring.
Figure 13:
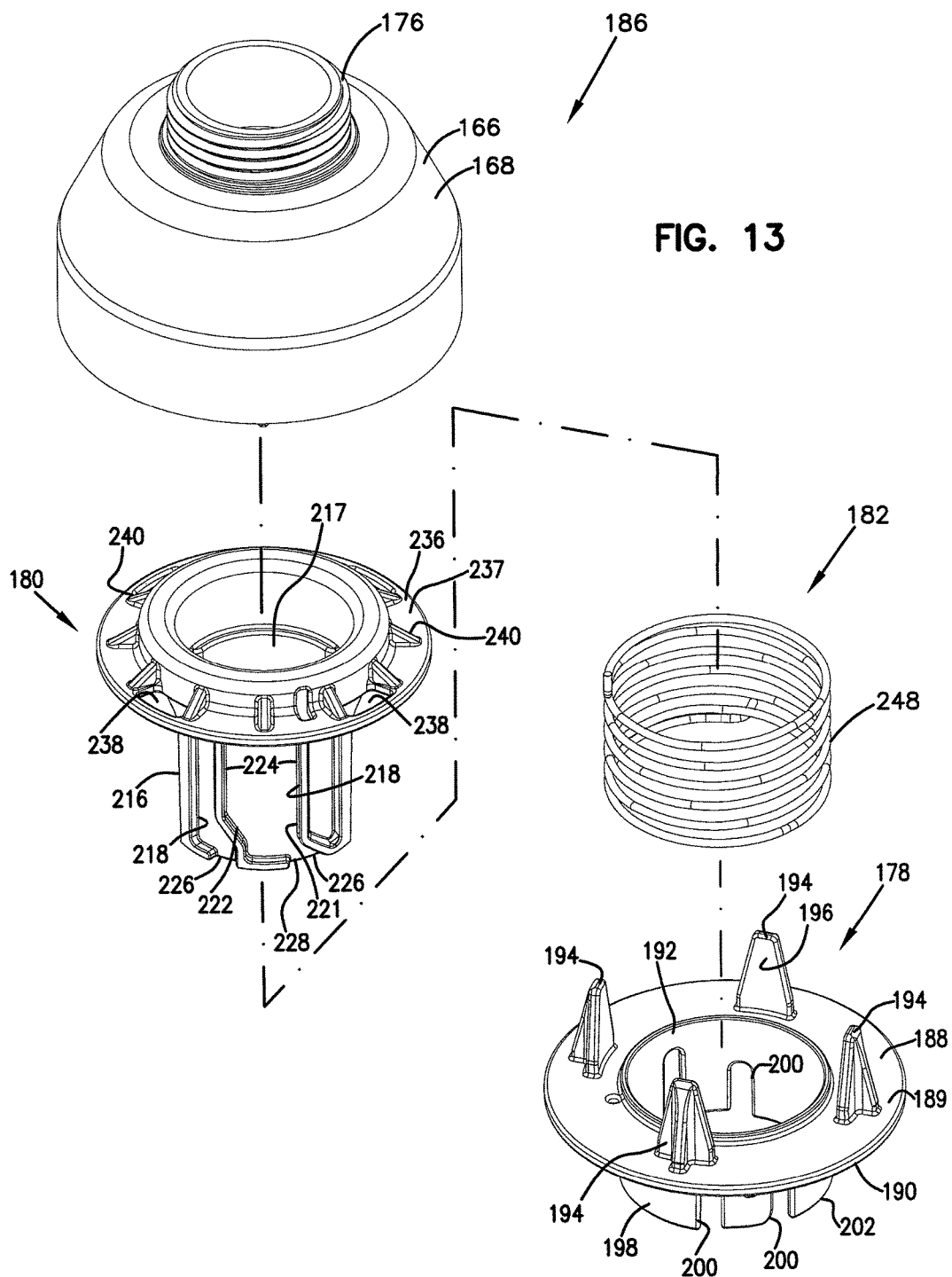
FIG. 13 is an exploded, perspective view of the adapter assembly of FIGS. 11 and 12 and showing the adapter, locking sleeve, locking spring, and locking ring.
Figure 17:
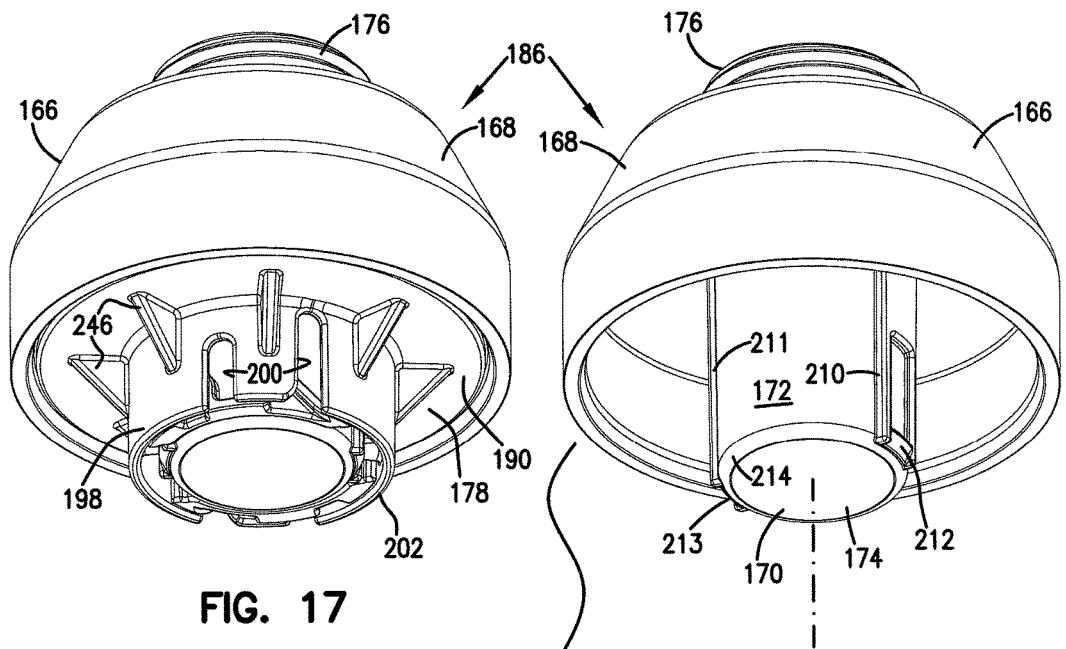
FIG. 17 is a lower perspective view of the adapter assembly of FIG. 11.

In reference now to FIGS. 11-13, the adapter assembly 186 is illustrated. In this embodiment, the adapter assembly 186 includes the adapter 166, the locking sleeve 180, the locking spring 182, and the locking ring 178.

As can be seen in FIG. 12, the funnel surface 168 circumscribes the inner tubular wall 170, as well as the locking ring 178 and the locking sleeve 180. The locking spring 182 is located between and against the locking ring 178 and the locking sleeve 180. The function of the spring 182 is described further below.

One embodiment of locking ring 178 is illustrated in perspective in FIG. 13. In this embodiment, the locking ring 178 includes a planar base 188 with first and second opposite axial surfaces 189, 190 that defines or circumscribes a central aperture 192. The inner tubular wall 170 of the adapter 166 fits within the central aperture 192 of the locking ring 178. Projecting from the first axial surface 189 in an axial direction and away from the first axial surface 189 is a plurality of fingers 194. In the embodiment of FIG. 13, there are four circumferentially spaced fingers 194, which are also evenly spaced about the first axial surface 189 of the planar base 188. In this embodiment, each of the fingers 194 has a generally trapezoidal shaped radial surface 196. The function of the fingers 194 is discussed further below.

Still in reference to FIG. 13, in this embodiment, the locking ring 178 further includes a skirt 198. The skirt 198 extends or projects from the second axial surface 190 in a direction opposite from the direction that the fingers 194 project. The skirt 198 defines a plurality of open slots 200. The slots are open from an end rim 202 that is remote from the base 188 and extend inwardly along the skirt 198. The slots 200 provide access to the locking sleeve by the protrusions 114, 115, 116, 117, as will be explained below.

Figure 18:
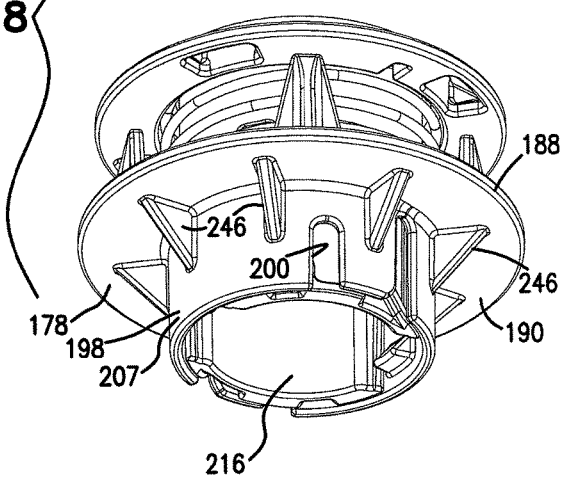
FIG. 18 is an exploded, perspective view of the adapter assembly of FIG. 17, which shows the adapter removed from an assembled locking ring, locking spring, and locking sleeve.

In reference now to FIG. 18, the locking ring 178 in the embodiment shown further includes a plurality of gussets 246 extending between the planar base 188 and the outer radial surface 207 of the skirt 198. The slots 126 in the key ring 110 (FIG. 7) receive the locking ring gussets 246 when the filter cartridge 46 is operably mounted onto the filter head 42.

In reference again to FIG. 12, in this embodiment, the skirt 198 of the locking ring 178 includes a plurality of radial tabs 204. The radial tabs 204 are shown extending from an inner radial surface 206 of the skirt 198. On the opposite side of the inner radial surface 206 of the skirt 198 is an outer radial surface 207. The tabs 204 help to hold the locking ring 178 relative to the adapter 166, as explained below.

The inner tubular wall 170 of the adapter 166 includes at least two spaced longitudinally extending projecting ridges 210, 211 (FIG. 18) and at least two spaced radial projecting ridges 212, 213 on the outer radial surface 172. In the embodiment shown in FIG. 12, the radial ridges 212, 213 are at the end rim 214 of the inner tubular wall 170. The radial tabs 204 of the skirt 198 snap under the radial projecting ridges 212, 213 on the outer radial surface 172 of the adapter 166. This helps to hold the locking ring 178 in place relative to the adapter 166. The longitudinal ridges 210, 211 on the inner tubular wall 170 of the adapter 166 cooperates with openings in the locking sleeve, 180, which will be discussed.

In reference again to FIG. 13, the locking sleeve 180 includes a tubular wall 216 defining an opening 217. As can be seen in FIG. 12, the opening 217 is sized such that the tubular wall 216 circumscribes and is against the outer radial surface 172 of the inner tubular wall 170 of the adapter 166. The locking sleeve tubular wall 216, in the embodiment shown, has a plurality of grooves 218 along the wall 216. As can be seen in FIG. 13, there is at least a first groove 221 and a second groove 222 defined within radially outwardly projecting longitudinal ridges 224. The grooves 221, 222 are accessible between the ridges 224 by openings 226 between the ridges 224 that are along the end rim 228 of the tubular wall 216.

Figure 25:
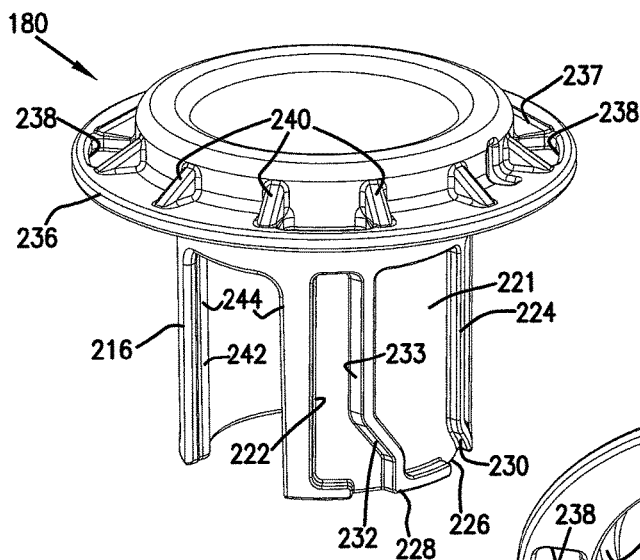
FIG. 25 is a perspective view of the locking sleeve.

In reference to FIG. 25, the first groove 221 includes a first ramp 230 adjacent to the opening 226. The first ramp 230 is defined by one of the longitudinal ridges 224, and is adjacent to the rim 228 and the opening 226. The first ramp 230 is for engaging either the first protrusion 114 or the third protrusion 116, as will be explained below.

Similarly, the second groove 222 includes a second ramp 232 defined by ridge 233. The second ramp 232 is spaced away from the rim 228 and spaced further in along the wall 216 than the first ramp 230 is. The second ramp 232 is for engaging the second protrusion 115 or fourth protrusion 117, as is discussed further below.

In reference again to FIG. 13, this embodiment of the locking sleeve 180 further includes a collar 236. In the embodiment depicted the collar 236 projects from and circumscribes the locking sleeve tubular wall 216. The collar 236 forms a brim 237 that surrounds the wall 216. Extending through the collar 236 are a plurality of finger-receiving apertures 238. The finger-receiving apertures 238 are sized and configured to received the fingers 194 of the locking ring 178, when the adapter assembly 186 is in an unlocked position.

As can be seen in FIG. 13, between the wall 216 and the collar 236, around an upper portion of the brim 237 of the collar 236 is a plurality of radial gussets 240. The gussets 240 help to strengthen the sleeve 180.

In reference again to FIG. 25, the locking sleeve tubular wall 216 defines a pair of longitudinal openings 242. The openings 242 are open and accessible from the end rim 228 and are defined as gaps in the wall 216. The longitudinal ridges 210, 211 (FIG. 18) of the inner tubular wall 170 of the adapter 166 are within the openings 242 of the locking sleeve 180. This helps to limit rotation of the locking sleeve 180 relative to the adapter 166 to a range of motion between the edges 244 of the openings 242 and the ridges 210, 211 (FIG. 12).

Figure 26:
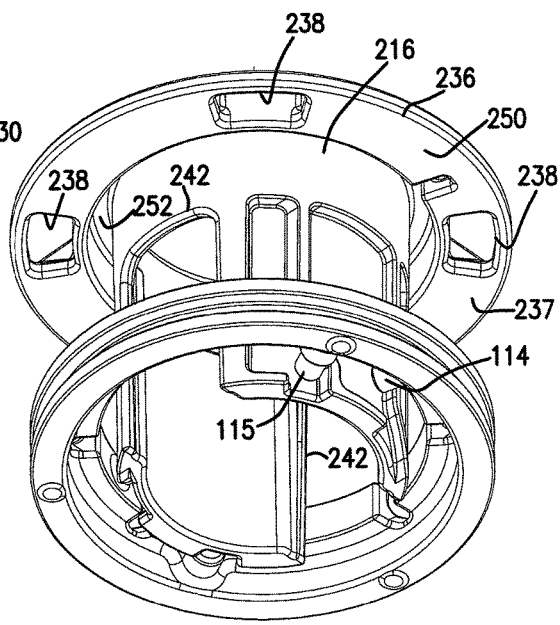
FIG. 26 is another perspective view of the locking sleeve and key ring of FIG. 24, in the second locked position and about to move into the unlocked position.

The locking spring 182, in this embodiment, is shown as a coiled metal spring 248. The locking spring 182 is located around the tubular wall 216 of the locking sleeve 180, as can be seen in FIG. 12. The locking spring 182 is located between the first axial surface 189 of the base 188 of the locking ring 178 and a pocket 252 (FIGS. 12 and 26). The pocket 252 is a volume defined between the collar 236 and the tubular wall 216 of the locking sleeve 180. A lower axial surface 250 can also be seen in FIG. 26, which is the lower axial surface 250 of the brim 237 of the collar 236.

E. Operation of the Lock Out

Figure 19:
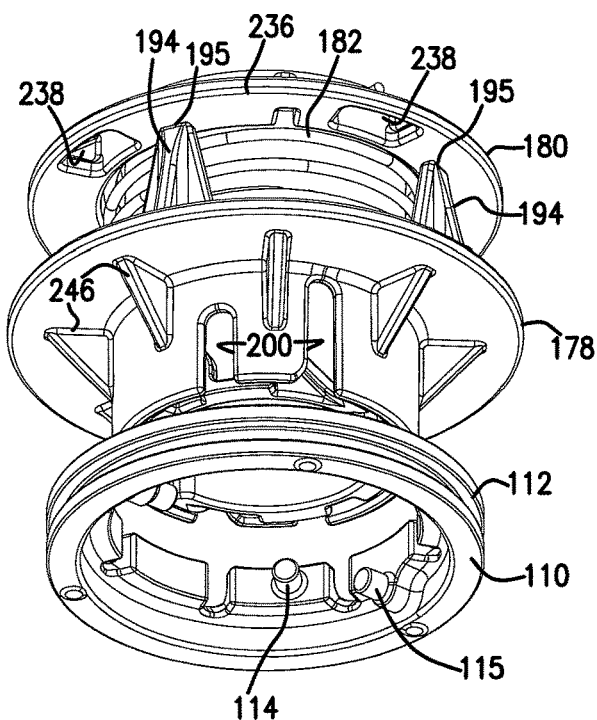
FIG. 19 is a perspective view of the locking sleeve, locking spring, locking ring, and a key ring that is part of the filter cartridge in a first locked position and with portions of the key ring misaligned with finger-receiving apertures in the locking sleeve.
Figure 20:
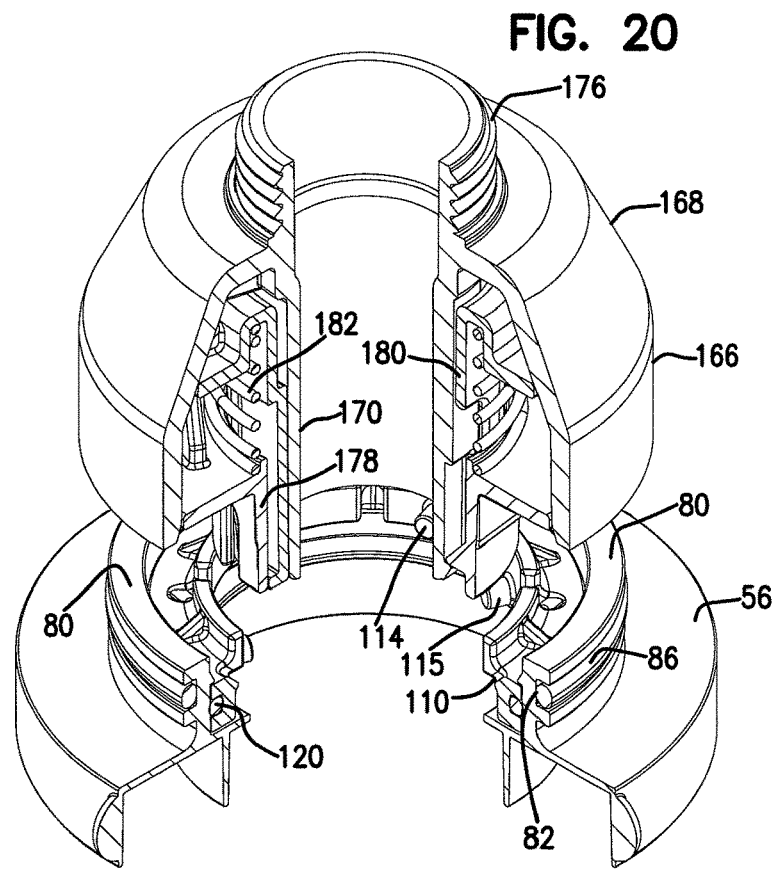
FIG. 20 is a cross-sectional, perspective view of the assembly of FIG. 19 in addition showing the adapter and a remaining portion of the end cap of the filter cartridge.

The locking sleeve 180 is rotatable relative to the locking ring 178 from a first locked position to an unlocked position. The first locked position is illustrated in FIG. 19. The first locked position includes the finger-receiving apertures 238 of the locking sleeve 180 being misaligned from the plurality of fingers 194 of the locking ring 178. By misaligned, it is meant that the fingers 194 are not lined up with the finger-receiving apertures 238, and as illustrated in FIG. 19, the fingers 119 are circumferentially spaced next to the finger-receiving apertures 238.

Figure 27:
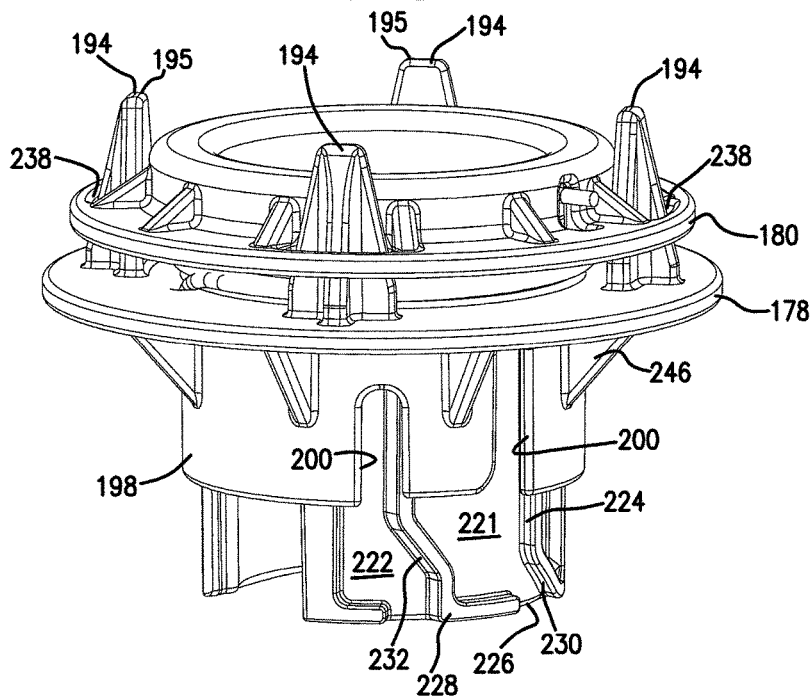
FIG. 27 is a perspective view showing the locking sleeve and the locking ring in an unlocked position.
Figure 28:
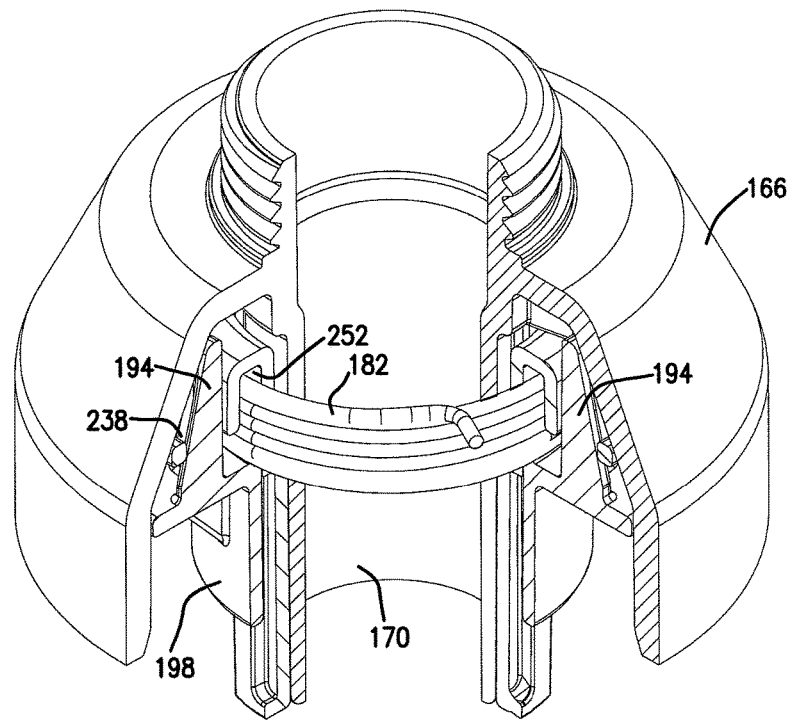
FIG. 28 is a perspective, cross-sectional view of the adapter assembly of FIG. 17 in an unlocked position.

The unlocked position is illustrated in FIG. 27. The unlocked position includes the finger-receiving apertures 238 being in alignment with the plurality of fingers 194 in the locking ring 178. As can be seen in FIG. 27, the fingers 194 are in circumferential alignment with the apertures 238 such that the fingers 194 penetrate the finger-receiving apertures 238, which allows the locking ring 178 to move axially relative to the locking sleeve 180 and to the adapter 166. By comparing to FIG. 19, it can be seen how in the first locked position, the fingers 194 are misaligned from the finger-receiving apertures 238 of the locking sleeve 180, and the tips 195 of the fingers 194 engage against the lower axial surface 250 (FIG. 26) of the collar 236, which blocks or prevents relative axial motion between the ring 178 and the sleeve 180. FIG. 27 shows the ring 178 axially moved upwardly relative to the locking sleeve 180, because the fingers 194 are in alignment with the finger-receiving apertures 238. The locking spring 182 is arranged to apply a torsional spring force to hold the locking sleeve 180 in the first locked position shown in FIG. 19.

When the adapter assembly 186 is in the unlocked position of FIG. 27, the filter cartridge 46 will be operably connectable to the filter head 42. In the first locked position of FIG. 19, the filter cartridge 46 will not be operably connectable to the filter head 42 because the relative axial length of the adapter assembly 186 in FIG. 19 prevents the threads 152 (or 138) on the cartridge housing 48 from connecting to the threads 159 on the filter head 42.

Figure 22:
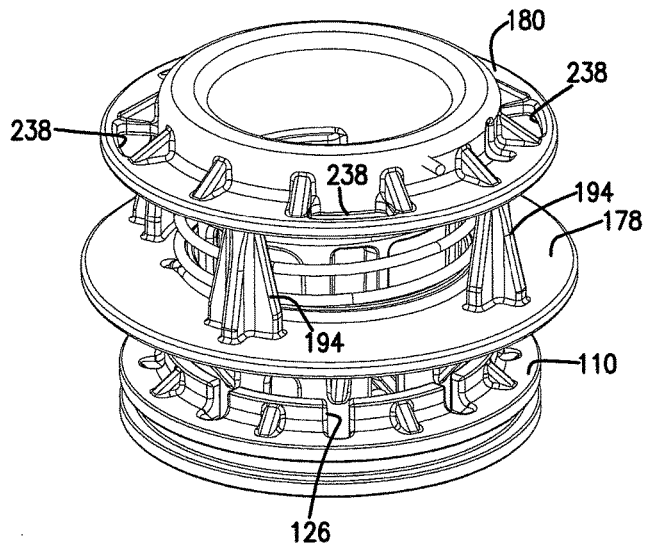
FIG. 22 is a perspective view of the assembly of FIGS. 19 and 21 and showing the assembly in a second locked position.

The locking sleeve 180 is also rotatable relative to the locking ring 178 from the first locked position (FIG. 19) to a second locked position (FIG. 22). The second locked position, as can be seen in FIG. 22, includes the finger-receiving apertures 238 of the locking sleeve 180 being misaligned from the plurality of fingers 194 in the locking ring 178. Thus, the second locked position also prevents the filter cartridge 46 from engagement with the filter head 42 because of the relative axial length of the adapter assembly 186. The second locked position prevents axial motion between the locking ring 178 and locking sleeve 180. The second locked position includes the fingers 194 circumferentially spaced away from the finger-receiving apertures 238, but closer to the finger-receiving apertures 238 than in the first locked position of FIG. 19. The tips 195 of the fingers 194 engage or abut the lower axial surface 250 (FIG. 26) of the collar 236.

Figure 23:
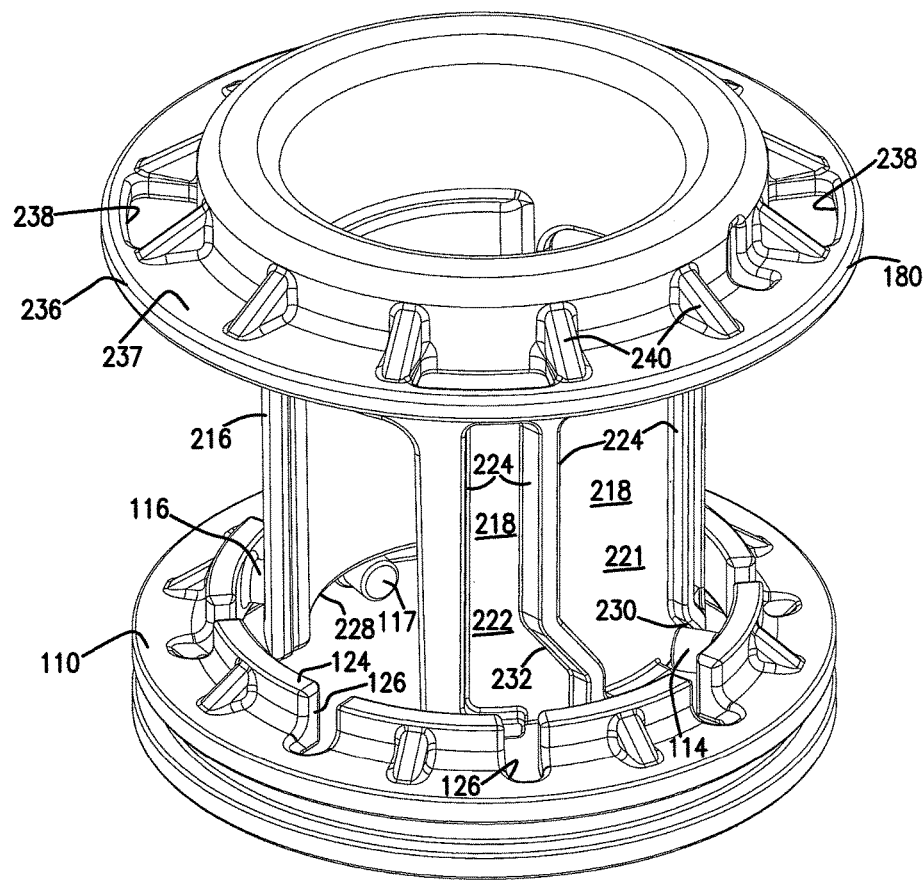
FIG. 23 is a perspective view similar to FIG. 22, but showing only the sleeve and key ring in the second locked position and just prior to being rotated to an unlocked position.
Figure 24:
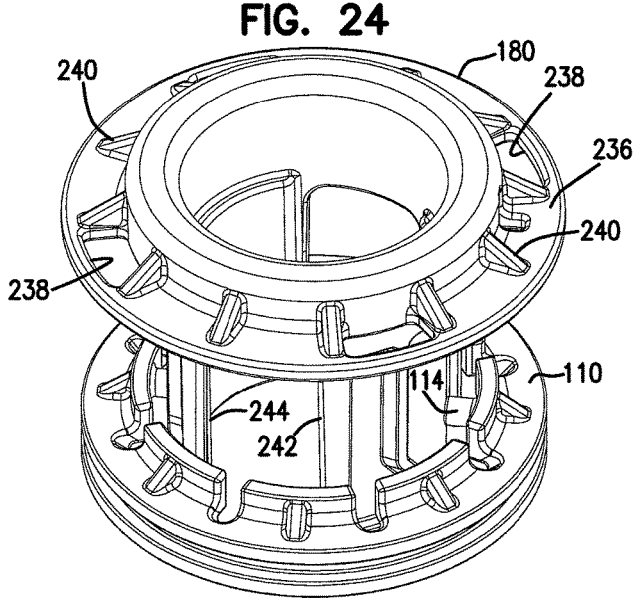
FIG. 24 is a perspective view of the locking sleeve and key ring in the second locked position, similar to that shown in FIG. 23.
Figure 29:
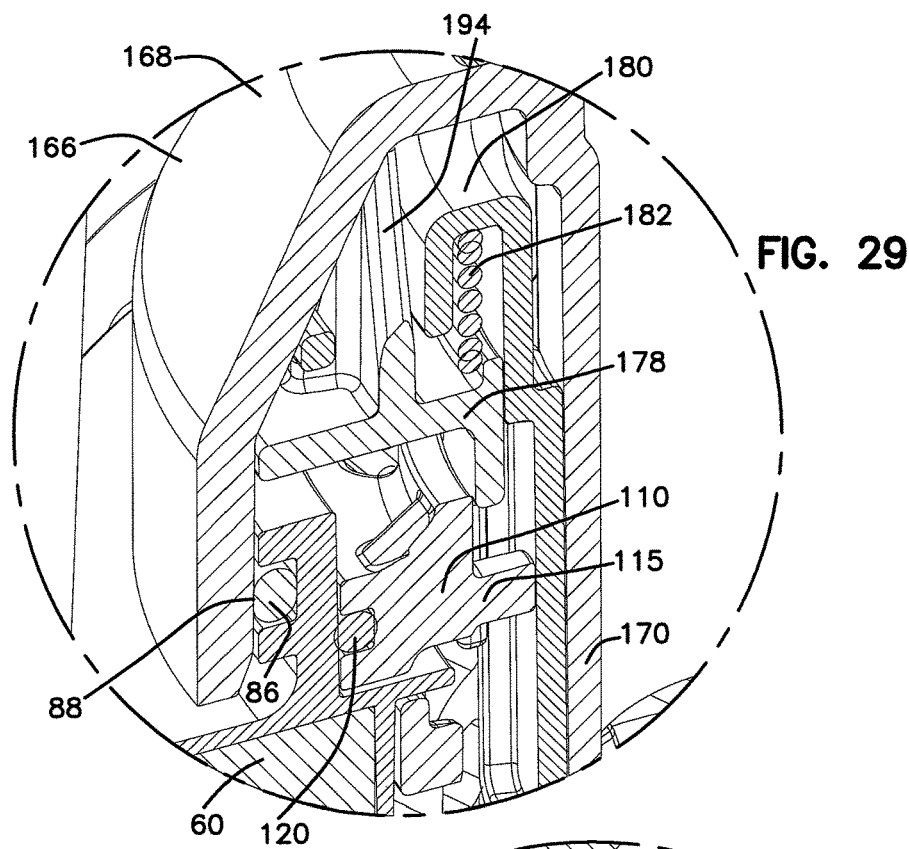
FIG. 29 is a perspective, cross-sectional view of a portion of the filter system fully engaged in an unlocked position.

When the filter cartridge 46, which is held by the housing 48 is going to be connected to the filter head 42, the first protrusion 114, and if present, the third protrusion 116, engage against the first ramp 230 (FIG. 25) of the first groove 221 by extending from the key ring 110, through one of the slots 200 of the locking ring 178. Engagement between the first protrusion 114 and the first ramp 230 rotates the locking sleeve 180 against the force of the spring 182 and rotates the sleeve 180 relative to the adapter 166 and the locking ring 178, thus moving the adapter assembly 186 from the first locked position to the second locked position. This rotation allows some axial motion of the locking ring 178 and filter assembly 44 relative to the adapter 166 and locking sleeve 180. This rotation and axial motion then puts contact between the second protrusion 115 (and if provided, the fourth protrusion 117) and the second ramp 232 (FIG. 23) in the second groove 222 through the slots 200 of the locking ring 178. Continued axial pressure between the filter cartridge 46 and the adapter assembly 186 will cause the second protrusion 115 to move against the ridge 233 (FIG. 25) and cause further rotation of the locking sleeve 180 against the spring 182 relative to the locking ring 178. Finally, the sleeve 180 and the ring 178 are moved rotationally relative to each other until the fingers 194 are in axial alignment with the finger-receiving apertures 238, which then allows the ring 178 to slide axially relative to the sleeve 180 by permitting the fingers 194 to penetrate the finger-receiving apertures 238. This then puts the adapter assembly 186 in the unlocked position (FIG. 27) which then permits connection between the threads 159 of the filter head 142 and then threads 138 or 152 of the cartridge housing 48 (FIG. 29).

Figure 30:
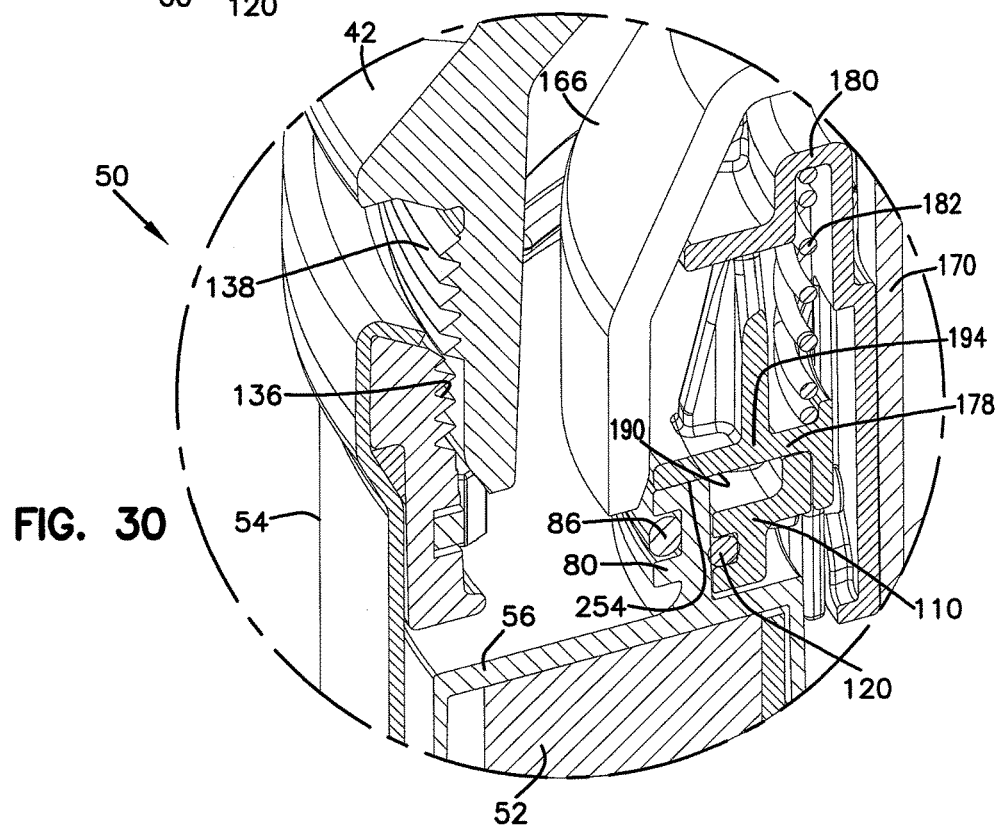
FIG. 30 is a perspective, cross-sectional view of a portion of a spin-on filter cartridge, as shown in FIGS. 9 and 10, and showing the spin-cartridge in a locked position.
Figure 31:
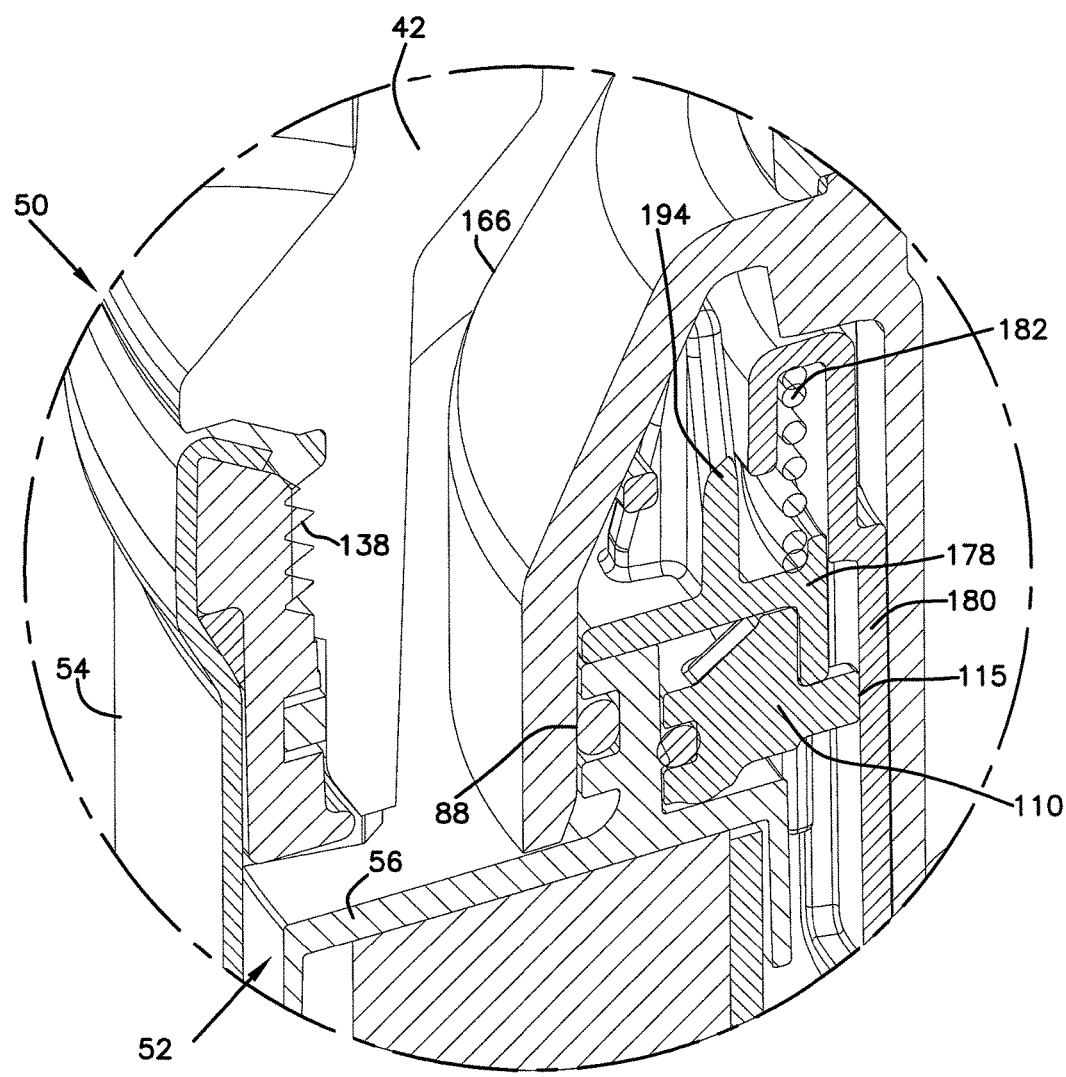
FIG. 31 is a view analogous to FIG. 30 of a spin-on assembly, but in this instance, the spin-on filter cartridge is in an unlocked position.

For the spin-on embodiment of FIGS. 9 and 10, the lock out mechanism works the same as for the bowl-cartridge assembly 45. FIGS. 30 and 31 show the spin-on assembly 50 in a locked position (FIG. 30) and in an unlocked position (FIG. 31). In FIG. 30, if the spin-on cartridge 52 did not have the proper key ring 110, then engagement between an end 254 of the neck 80 and the second axial surface 190 (FIG. 18) of the locking ring 178 will prevent any further axial motion between the spin-on assembly 50 and the filter head 42. This will prevent mating of the threads 136 and 138. In FIG. 31, it can be seen how the key ring 110 on the cartridge 52 has moved the adapter assembly 186 from the locked position of FIG. 30 to the unlocked position of FIG. 31, with the fingers 194 penetrating the finger-receiving apertures 238 of the locking sleeve 180.

If an attempt is made to connect to the filter bowl 140 to the filter head 42 without a cartridge 46, the tabs 151 (FIGS. 15 and 15A) will come in contact with the end rim 202 (FIG. 14) of the locking ring 178. This will prevent the bowl 140 from getting close enough to the filter head 42 such that the threads 152 and 159 cannot engage.

In FIGS. 16 and 16A, the filter bowl 140 and filter head 42 are shown, and the system 40 is in a locked position because, the cartridge 46' installed within the filter bowl 140 lacks a key ring 110. The locking ring 178 cannot move axially upwardly from its position shown in FIG. 16 because the fingers 194 engage against the second axial surface 190 of the base 188 of the locking sleeve 180.

From the above, it should be apparent how to use the filter assembly 44. First, there is a step of orienting the filter assembly 44 onto the filter head 42. While orienting, the filter assembly 44 is pushed against the locking sleeve 180 to rotate the sleeve 180 and move the sleeve 180 from the locked position (FIG. 21) to the unlocked position (FIG. 27), aligning the fingers 194 of the locking ring 178 with the finger-receiving apertures 238 of the locking sleeve 180. Next, there is the step of axial moving both the filter assembly 44 and the locking ring 178 relative to the filter head 42. Finally, the filter assembly 44 is operably connected to the filter head 42.

F. Additional Variations

FIGS. 34-40 illustrate additional variations that can be used fully with the system and all of its parts and pieces described previously in FIGS. 1-33. As such, each of these variations will not be described fully will all of the other functioning parts. Rather, it should be understood that the variations in FIGS. 34-40 are usable with everything described fully above. To the extent appropriate, the above text and description is incorporated herein by reference.

FIGS. 34-36 illustrate a variant in the key ring 110 and first end cap 56. In the embodiment of FIGS. 34-36, the first end cap will bear reference numeral 356, while the key ring will bear reference numeral 410. In the embodiment of FIGS. 34-36, the function of selectively rotating the key ring 410 is implemented with a bump arrangement 420 instead of with a friction ring 120. The bump arrangement 420 is a friction-inducing structure.

In reference to FIGS. 35 and 36, the first end cap 356 has a first open aperture 358. In use, the first open aperture 358 is in communication with the open filter interior 64 of the tubular construction of filter media 60. The first end 61 of the filter media 60 is secured to the first end cap 356. The first end cap 356 has an inner wall 372 lining the first open aperture 358. There is an outer wall 374, which circumscribes the filter media 60 (FIG. 7). A transverse base 376 extends between the inner wall 372 and outer wall 374. The base 376 also covers the first end 61 of the filter media 60. In the illustrated embodiment, the first end cap 356 further includes a plurality of radial projections 378 that help to center the filter cartridge 46 (FIG. 7) within the cartridge housing 48.

The first end cap 356, in the example shown, defines an axially extending neck 380. The neck 380 extends or projects axially from the base 376 and defines an outer radial surface 382 and an opposite inner radial surface 384. The first end cap 356 holds a first end cap seal member 386. The first end cap seal member 386 forms a seal, such as seal 88 illustrated in FIG. 2 between the filter cartridge 46 and the filter head 42.

As can be seen in FIGS. 35 and 36, the base 376 includes a base portion 377 that is circumscribed by the neck 380. That is, the base portion 377 is within and adjacent to the inner radial surface 384 of the neck 380. The bump arrangement 420 includes a plurality of bumps 422 on the first end cap 356 in order to introduce friction and interact with structure on the key ring 410. In the example shown, the bumps 422 are on the base 376. In the particular example shown in FIGS. 34-36, the bumps 422 are located on the base portion 377. The bumps 422 include, in this example, dome shaped projections that extend in an axial direction away from the base portion 377 of the base 376.

The key ring 410, as with the key ring 110, includes a plurality of protrusions that extend radially from the inner radial surface 429. The protrusions are located analogously as described with respect to protrusions 114-117, above, and that description is incorporated herein by reference. It should be noted that in the embodiment of FIG. 36, because of the view shown, only three of the four protrusions are visible, protrusions 402, 403, and 405. Protrusions 403 and 405 are analogous to the second and fourth protrusions 115, 117. Protrusion 402 is analogous to the first protrusion 114. The protrusion analogous to third protrusion 116 cannot be seen in FIG. 36, but it should be apparent from review of the embodiment of the key ring 110, by comparison to the key ring 410.

In the embodiment of FIG. 36, the protrusions 402, 403, 405 are not round, as shown in the protrusions 114-117, but partially round. Specifically, the protrusions 403, 405 have a flat, planer section that can, in some embodiments, be parallel to the second axial surface 427. The protrusion 402 has a flat section that, in some embodiments, can be parallel to the first axial surface 426.

The key ring 410 is constructed analogously as key ring 110, but instead of having friction ring 120, it includes bumps 424. The bumps 424 are positioned on the key ring 410 such that they axially engage the bumps 422 on the first end cap 356. In the example shown in FIG. 36, the key ring 410 includes a first axial surface 426 and an opposite second axial surface 427. Between the first and second axial surfaces 426, 427 is an outer radial surface 428 and an inner radial surface 429. In this example, the bumps 424 are located on the second axial surface 427 such that when the key ring 410 is placed within the neck 380 of the end cap 356, the second axial surface 427 will rest upon and engage against the base portion 377 of the base 376 of the end cap 356. The outer radial surface 428 will be adjacent to and against the inner radial surface 384 of the neck 380. The bumps 424, in this embodiment, are generally dome shaped projections and interfere with the bumps 422.

With the key ring 410 installed in the end cap 356, the bumps 422, 424 interfere with each other to create drag between the bumps 422, 424, which causes the key ring 410 to move (rotate) with the end cap 356, when the cartridge housing 48 and cartridge 46 is being rotated in order to line up the protrusions (illustrated previously as 114-117 and in the embodiment of FIG. 36, shown as 402, 403, and 405) with the slots in the locking ring 178. Once the protrusions 402, 403, and 405 begin to move axially into their respective slots in the locking ring 178, the key ring 410 can no longer rotate because the slots in the locking ring 178 are fixed relative to the filter head 42 and do not rotate. The forces that now require the protrusions 402, 403, and 405 to move only axially upwards are great enough to overcome the friction between the bumps 422 and 424, allowing the bumps 422, 424 to ride over each other, in turn, allowing the key ring 410 to remain rotationally fixed to the filter head 42, while the end cap 356 continues to rotate with the filter cartridge 46.

In reference again to FIGS. 34-36, the end cap 356 further includes projections 387 along the inner radial surface 384 of the neck 380. The projections 387 axially retain the key ring 410 in the end cap 356 after assembly. During assembly of the key ring 410 to the end cap 356, the outer periphery or outer radial surface 428 of the key ring 410 moves over an angled side 389 (FIG. 35A) of the projections 387 until the first axial surface 426 of the key ring 410 snaps past the projections 387. The key ring 410 is now held axially in place by surface 391 (FIG. 35A) of the projections 387 overlapping the first axial surface 426 of the key ring 410.

Figure 39:
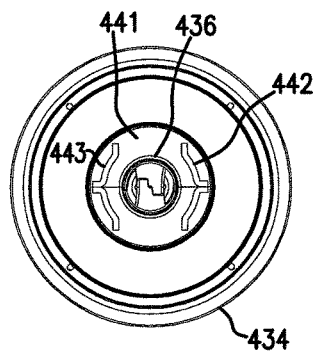
FIG. 39 is a top view of the filter cartridge housing of FIG. 38.
Figure 38:
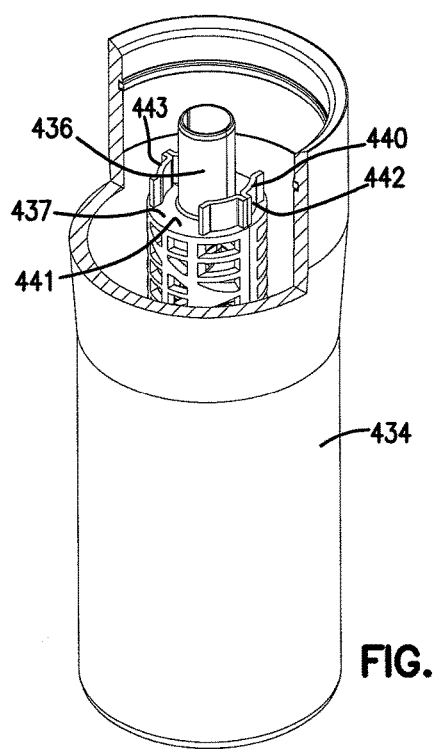
FIG. 38 is a perspective view, with portions removed for purposes of illustration, of the filter cartridge housing of FIG. 37, which shows parts of an inner liner that engage portions of the adapter assembly if an attempt is made to connect the cartridge housing with the filter head and without a proper filter cartridge installed therein.
Figure 37:
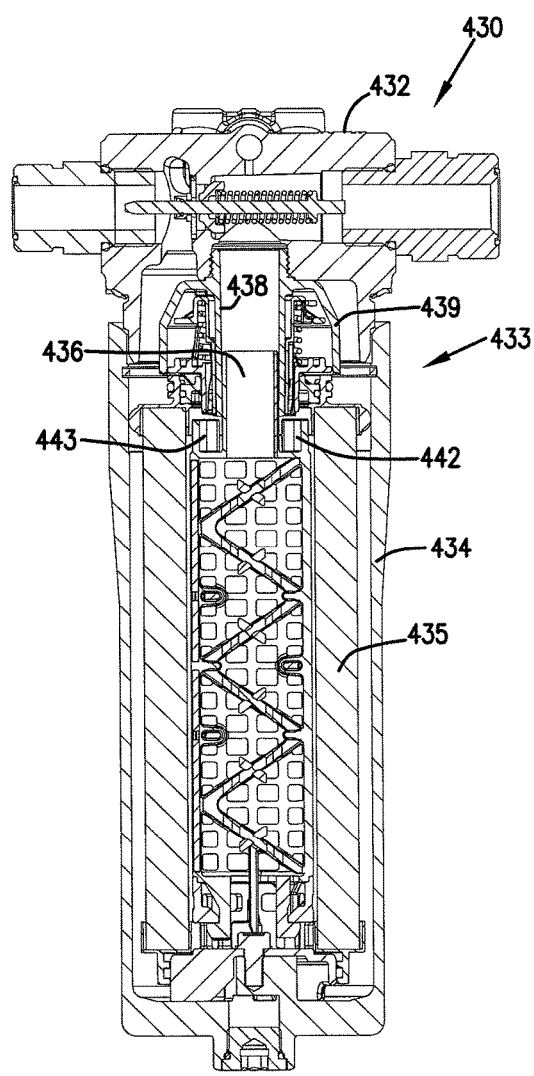
FIG. 37 is a cross-sectional view of another embodiment of the filter system, constructed in accordance with principles of this disclosure.

In reference now to FIGS. 37-39, further variations are shown and described. Again, any of these variations can be used with the system 40, including filter head 42, cartridge 46, and all of the other features. As such, the description of FIGS. 1-36 are incorporated herein by reference as being usable with the variations shown in FIGS. 37-39. In FIG. 37, a filter system is shown at 430. The system 430 includes a filter head 432 removably connected to a bowl-filter assembly 433. The assembly 433 includes a cartridge housing 434 and a removable and replaceable filter cartridge 435. All of these features are analogous to the features previously described, and those descriptions are incorporated herein by reference.

To help the filter cartridge 435 become centered relative to the assembly in the filter head 432, a guide sleeve 436 has been added on to the top of the inner liner 437. The guide sleeve 436 helps to align the cartridge 435 within the inner tubular wall 438 of the adapter 439. Once centered, the technician servicing the system 430 will rotate the assembly 433, preferably less than one full turn to get the protrusions 114-117 lined up with the slots 200 (FIG. 19) of the locking ring 178, allowing for rotation of the locking sleeve 180 against the force of the spring 182 to rotate the sleeve 180 relative to the adapter 439 and the locking ring 178, thus moving the adapter assembly 186 from the first locked position to the second locked position. This rotation allows some axial motion of the locking ring 178 and the filter assembly 433 relative to the adapter 439 and locking sleeve 180. This rotation and axial motion puts contact between the second protrusion 115 and the second ramp 232 (FIG. 23) in the second groove 222 through the slots 200 of the locking ring 178. Continued axial pressure between the filter cartridge 435 and the adapter assembly 186 will cause the second protrusion 115 to move against the ridge 233 (FIG. 25) and cause further rotation of the locking sleeve 180 against the spring 182 relative to the locking ring 178.

Finally, the sleeve 180 and the ring 178 are moved rotationally relative to each other and until the fingers 194 are in axial alignment with the finger-receiving apertures 238, which then allows the ring 178 to slide axially relative to the sleeve 180 by permitting the fingers 194 to penetrate the finger-receiving apertures 238. This then puts the adapter assembly 186 in the unlocked position (FIG. 27) and allows the bowl-cartridge assembly 433 to be threadably connection on to the filter head 432.

In preferred embodiments, the inner liner 437 includes a tab projection arrangement 440. In this embodiment, the tab projection arrangement 440 extends axially in a direction from a top 441 of the inner liner 437 in a direction toward the filter head 432. In the embodiment shown, the tab projection arrangement 440 includes first and second tabs 442, 443 projecting from the top 441 and on opposite sides of the sleeve 436. As can be seen in FIG. 39, the tabs 442, 443 are located about 180° apart from each other. The tabs extend less than 50% of the length of the sleeve 436 along the length of the sleeve 436. In one example, the tabs 442, 443 extend between 5% and 40% of the length of the sleeve 436 from the top 441 of the inner liner 437. The tabs 442, 443 help to prevent the cartridge housing 434 from being connected to the head 432 when the filter cartridge 435 is missing from the housing 434.

Figure 40:
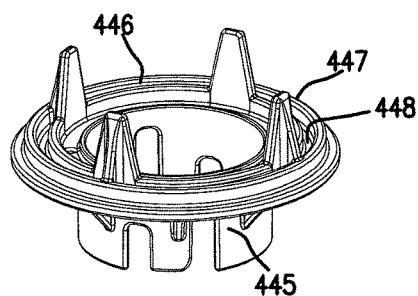
FIG. 40 is another embodiment of a locking ring, usable with systems previously described.

In reference now to FIG. 40, a variation to the locking ring 178 is illustrated. In FIG. 40, the locking ring is shown at reference numeral 445. The locking ring 445 has all of the same features and functions as locking ring 178, and the locking ring 445 can be used with all of the previous features and embodiments previously described. In the embodiment of FIG. 40, the locking ring 445 includes two sets of ribs 446-447. The ribs 446, 447 enhance the strength of the locking ring 445. The ribs 446, 447 are located along the base 448, which in the embodiment of FIG. 13, is planar at reference numeral 188. The function of the locking ring 445 is exactly the same as the locking ring 178.

The above is a description of examples and principles. Many embodiments can be made utilizing these principles. It is noted that not all the specific features described herein need to be incorporated in an arrangement for the arrangement to have some selected advantage according to the present disclosure.

We claim:

1. A filter cartridge for releasable connection with a filter head; the filter cartridge comprising:
   (a) a first end cap defining a first open aperture;
      (i) the first end cap holding a first end cap seal member;
      (ii) the first end cap defining an axially extending neck having an outer radial surface and an inner radial surface;
         (A) the first end cap seal member being held by the axially extending neck on the outer radial surface;
   (b) a key ring within and against the inner radial surface of the neck and circumscribing the first open aperture;
   (c) friction-inducing structure between the key ring and the first end cap including a friction ring and a bump arrangement; the friction ring being between an outer radial surface of the key ring and the inner radial surface of the neck;
      (i) the friction inducing structure holding the key ring fixed to the first end cap, and under rotational force, permitting the key ring to move rotationally about a longitudinal axis relative to the first end cap; and
   (d) a filter media construction secured to the first end cap.

2. A filter cartridge according to claim 1 further comprising:
   (a) a second end cap secured to the filter media at an end opposite of the first end cap.

3. A filter cartridge according to claim 1 further comprising:
   (a) at least first and second protrusions extending from the key ring and into the first open aperture;
      (i) the first protrusion being spaced from the second protrusion in a vertical direction along the key ring;
      (ii) the first protrusion being circumferentially spaced from the second protrusion along the key ring.

4. A filter cartridge according to claim 3 wherein:
   (a) the first protrusion and the second protrusion are located greater than 35° of each other;
   (b) the first open aperture of the first end cap defines an inner diameter;
   (c) the vertical distance between the first and second protrusions is 8-15% of the inner diameter.

5. A filter cartridge according to claim 3 further comprising:
   (a) at least a third protrusion extending from the key ring into the first open aperture;
      (i) the third protrusion being circumferentially spaced from the first protrusion and the second protrusion;
      (ii) the third protrusion being vertically spaced from only one of either the first protrusion or the second protrusion.

6. A filter cartridge according to claim 5 further comprising:
   (a) at least a fourth protrusion extending from the key ring into the first open aperture;

(i) the fourth protrusion being circumferentially spaced from the first, second, and third protrusions;
(ii) the fourth protrusion being vertically spaced from the third protrusion and only one of the first protrusion or the second protrusion.

7. A filter cartridge according to claim 1 wherein:
(a) the key ring includes an axial end tip defining a plurality of circumferentially spaced open slots;
    (i) the slots for receiving parts of the filter head, when the filter cartridge is mounted onto the filter head.

8. A filter cartridge according to claim 1 wherein:
(a) the first end cap has a plurality of projections extending therefrom;
    (i) the projections engaging a portion of cartridge housing, when the cartridge is installed in the housing, to space the filter cartridge from the portion of the cartridge housing.

\* \* \* \* \*